United States Patent
Kashima

(10) Patent No.: US 6,944,400 B2
(45) Date of Patent: Sep. 13, 2005

(54) OPTICAL PATH SWITCHING DEVICE

(75) Inventor: Masayuki Kashima, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 665 days.

(21) Appl. No.: 09/973,755

(22) Filed: Oct. 11, 2001

(65) Prior Publication Data

US 2002/0044319 A1 Apr. 18, 2002

(30) Foreign Application Priority Data

Oct. 18, 2000 (JP) ........................................ 2000-317462

(51) Int. Cl.[7] .............................................. H04J 13/02
(52) U.S. Cl. .............................. 398/56; 398/49; 398/77; 398/78
(58) Field of Search ................................ 370/320, 335, 370/342, 441, 343, 479, 147; 398/139, 82, 45, 78, 175, 51, 43; 385/28; 375/145

(56) References Cited

U.S. PATENT DOCUMENTS 6,212,174 B1 * 4/2001 Lomp et al. ................ 370/335

* cited by examiner

*Primary Examiner*—M. R. Sedighian
*Assistant Examiner*—David C. Payne
(74) *Attorney, Agent, or Firm*—Venable; James R. Burdett

(57) ABSTRACT

An optical path switching device is provided whereby changeover of optical path can be achieved with higher speed than conventionally. In this optical path switching device, a plurality of despreaders and a plurality of spreaders are connected in a prescribed corresponding relationship, extraction of a desired code path signal from a code division multiplexing signal that is input from an input circuit is performed, by means of despreaders that are capable of code selection and/or setting to OFF, and the extracted code path signal is given a new code by a spreader and output to an output circuit.

28 Claims, 18 Drawing Sheets

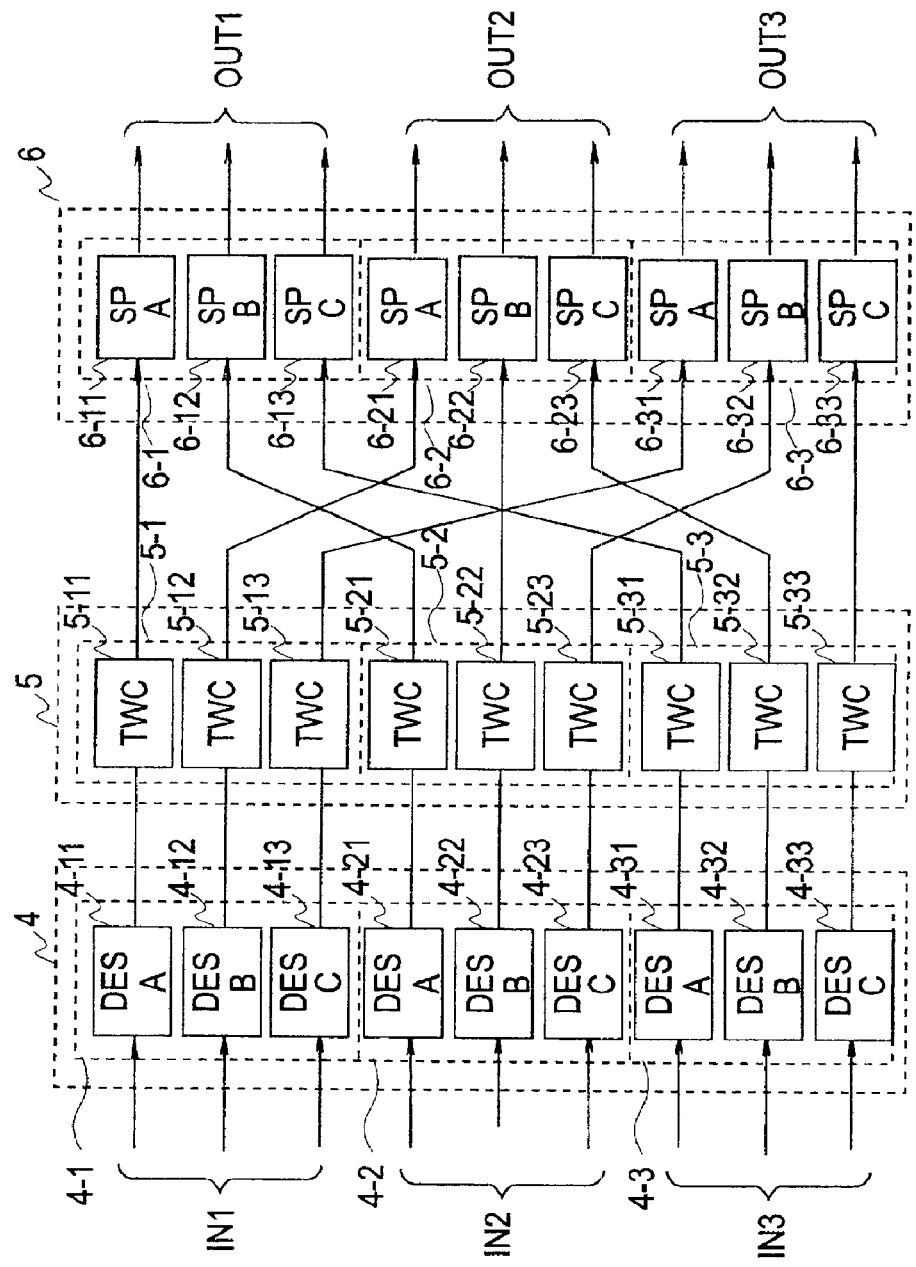

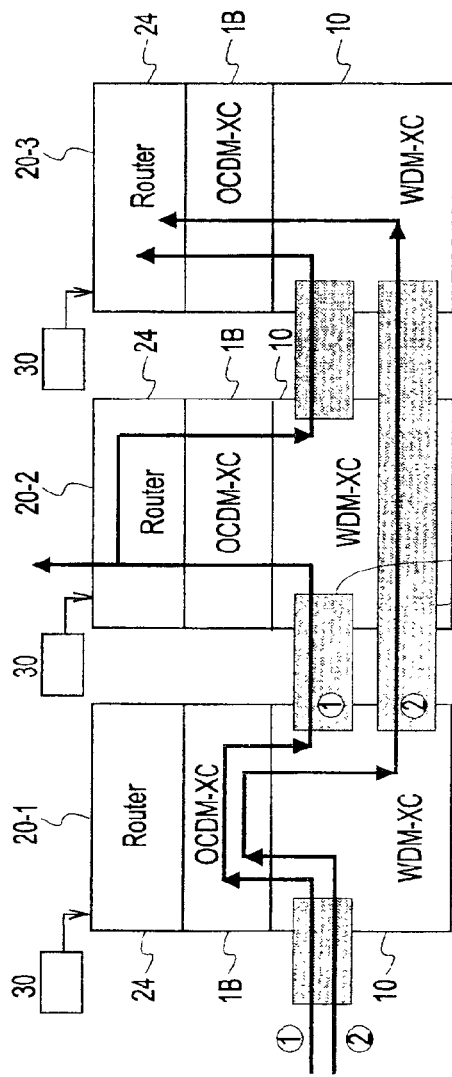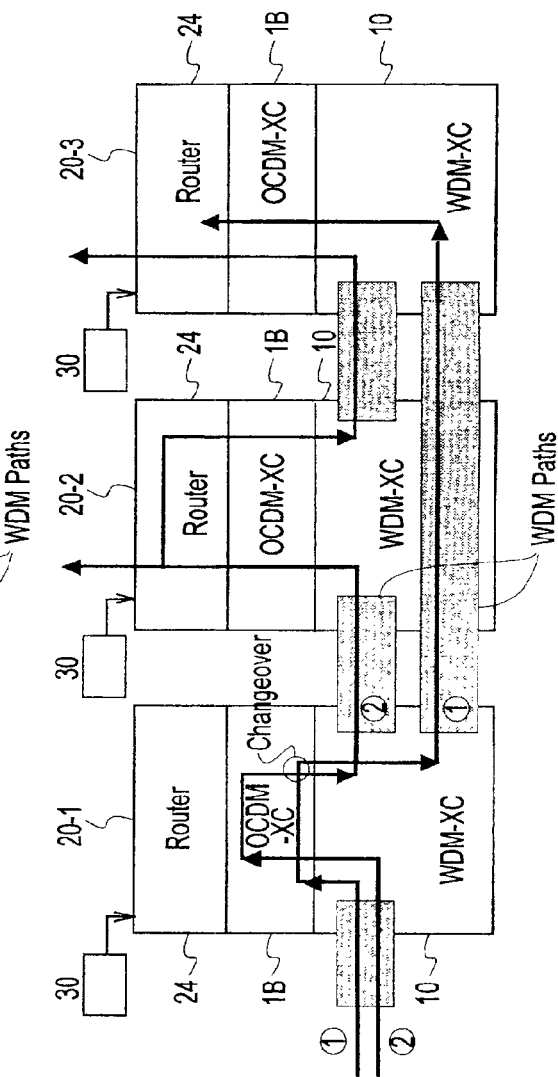
FIG. 13(A)
FIG. 13(B)

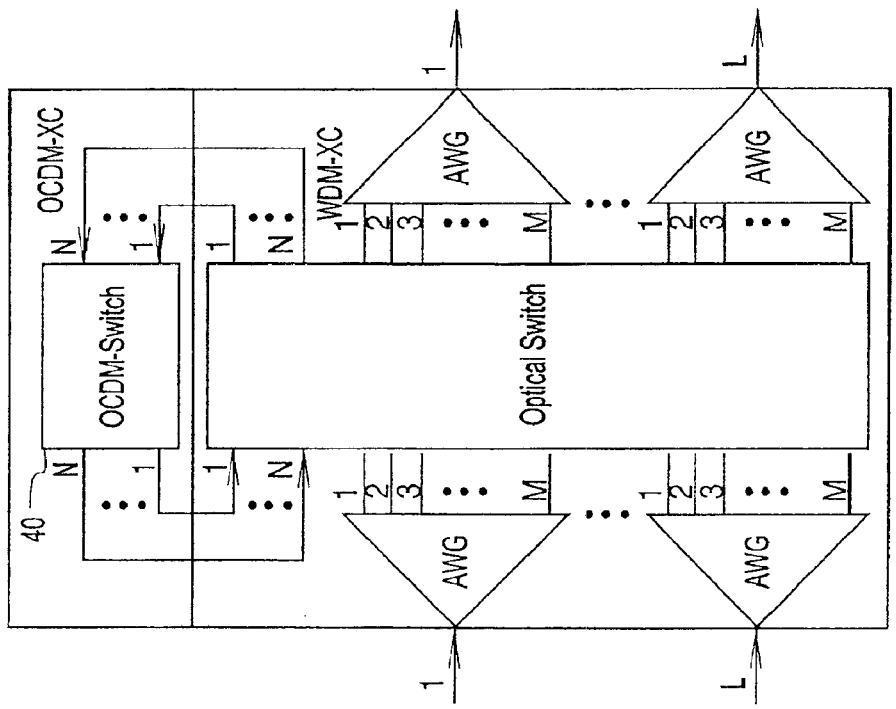
FIG. 15(B) Partial Changeover
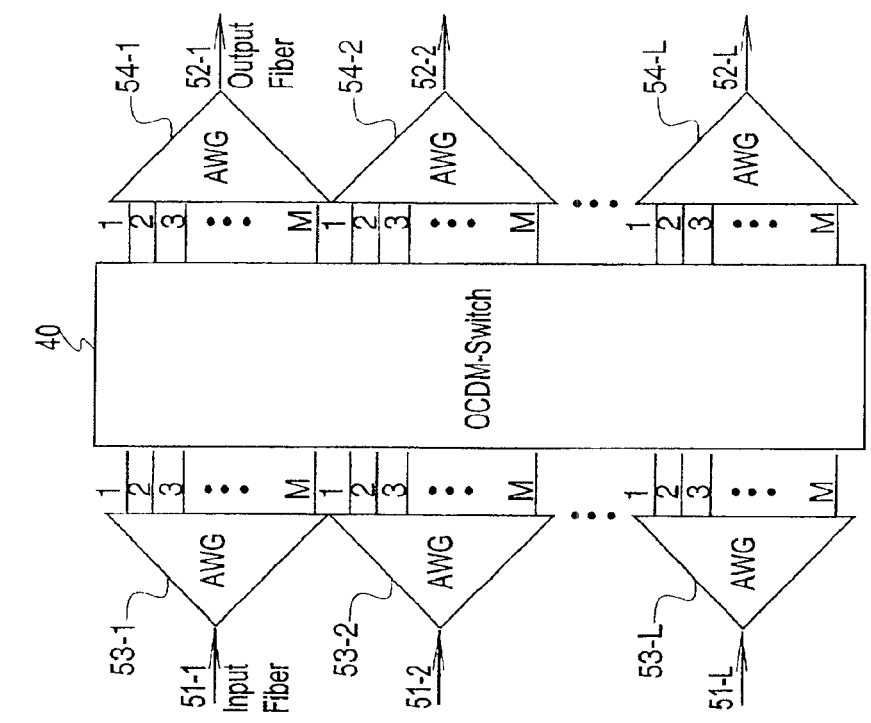
FIG. 15(A) Full Changeover

OPTICAL PATH SWITCHING DEVICE

BACKGROUND OF THE INVENTION

1. Field of the Invention

The present invention relates to an optical path switching device and relates for example to an optical path converter suitable for application to an optical cross connector device or an optical add/drop multiplexer or optical switch device.

2. Description of Related Art

In recent years, in optical network systems suitable for high transmission rates and increased capacity, close attention is being paid to optical signal multiplexing techniques.

A time division multiplexing (TDM) system is a system whereby a plurality of signals can be time-wise multiplexed and transmitted by a single transmission path. In this system, when the capacity per channel or the number of channels is increased, high-speed optical transmitters/receivers and electrical circuitry are required. Recently, also, optical time division multiplexing (OTDM) systems using optical pulses (RZ signals) have been studied; however, with such OTDM systems, the same level (rate) of electrical processing is involved as in the case of TDM systems. Wavelength division multiplexing (WDM) is a system in which multiplexing is performed using wavelength; with this WDM system, transmission capacity can be increased without raising the signaling rate. However, with the WDM system, in order to ensure a large number of channels (number of wavelengths), it is necessary to take measures in regard to wavelength stabilization of the signal transmission/reception unit (light source/optical filter), which increase costs. Equipment that is currently practically used provides a number of channels of about 100 wavelengths, but is expensive. These techniques are effective for transmitting enormous quantities of data such as for a backbone system.

A different technique from the techniques described above for increasing the degree of multiplexing which is being studied is the optical code division multiple access (OCDM) technique. Although the optical code division multiple access system is in itself inferior to other multiplexing techniques, it can easily be combined with other techniques, so where, for example in a wavelength division multiplexing system, it is difficult to increase the number of wavelengths, an increase in the number of channels can be achieved by combining the wavelength multiplexing technique and the optical code division technique.

Also, in the case of backbone networks, use of optical cross connector devices (OXC) or optical add/drop multiplexers (OADM) is being studied. In such devices, the communication path is changed with the signal still in the form of light, without converting it to an electrical signal. Such optical path alterations were conventionally performed using an optical switch.

The changeover speed of currently used optical switches is a few "ms", so it is difficult to achieve much increase in speed of optical path changeover without devising a new optical path changeover system. In other words, with an OXC or OADM using an optical switch, only restoration changeover (said to require about 50 ms in the case of SDH) can be performed and changeover without any momentary interruption (changeover time 1 ms or less) or dynamic changeover in response to traffic is difficult to achieve.

SUMMARY OF THE INVENTION

An object of the present invention is to provide an optical path switching device capable of changing over optical path at higher speed than conventionally.

A further object of the present invention is to provide an optical path switching device capable of performing path changeover at high speed by utilizing optical code division multiplexing techniques for path changeover and performing changeover of spreading code on spectrum despreading processing.

Yet a further object of the present invention is to provide an optical path switching device capable of achieving path changeover without any momentary interruption when path changeover is required, by performing setting of a new path after temporary evacuation to a free path.

Yet a further object of the present invention is to provide an optical path switching device capable of achieving, as well as path changeover without any momentary interruption when path changeover is required, rapid path changeover in response to fluctuation of traffic.

Yet a further object of the present invention is to provide an optical path switching device wherein the number of circuits can be increased without increasing the number of spreading codes i.e. which is capable of being scaled up.

In order to achieve the above objects, according to a first aspect of the present invention, an optical path switching device has the structural feature of comprising a construction in which optical code division multiplexing signals from a plurality of input circuits (or lines) are input, the signals of each of the codes (i.e. spreading codes) in the input code division multiplexing signals are converted, and the optical code division multiplexing signals whose codes have thus been converted are output to a plurality of output circuits (or lines). An optical path switching device of this construction can be made to function as an optical cross connector device.

Specifically, this optical path switching device basically comprises a spectrum despreading section, a spectrum spreading section coupled with this spectrum despreading section, and a combining section coupled with this spectrum spreading section.

This spectrum despreading section respectively outputs optical signals that have been subjected to spectrum despreading processing by performing spectrum despreading processing on branched optical signals with spreading codes respectively set from outside. This spectrum despreading section comprises a spectrum despreading stage for each input circuit; the respective spectrum despreading stages include despreaders of a number corresponding to the number of codes in the input signal i.e. the optical code division multiplexing signal that is input from these input circuits. Each despreader is of a construction capable of selecting one or other single code of all the codes included in all the input signals. Each despreader performs spectrum despreading processing with this selected code.

Also, this spectrum spreading section performs respective spectrum spreading processing on the optical signals that were subjected to spectrum despreading processing with fixed spreading code, and respectively outputs optical signals subjected to spectrum spreading processing having respective fixed spreading codes. This spectrum spreading section comprises spectrum spreading stages for each output circuit, these respective spectrum spreading stages being coupled with the spectrum despreading stages in a one-to-one correspondence relationship with the spectrum despreading stages. Each spreader has set therein a fixed code (that is, code selection cannot be performed, the code being pre-allocated) and performs spectrum spreading processing with this fixed code.

The combining sections are constructed to respectively perform code division multiplexing on the optical signals that were subjected to spectrum spreading processing before outputting them to the output circuits.

With such a construction, selection of the code in these despreaders is performed based on an electrical selection instruction from outside, so the time required for changeover of signal path can be very considerably shortened compared with conventional devices. Also, with this construction, it is possible to cope with requirements to scale up the number of input/output ports, without increasing the number of spreading codes.

Preferably, a branching section that branches the input signal from the input circuit is provided at front stage of the spectrum despreading section. This branching section comprises a single branching stage for each input circuit. The branch signals from each branching stage are respectively separately input to the despreaders included in the spectrum despreading section corresponding to each branching stage.

Preferably optical couplers are employed for the splitters and combiners.

According to a second aspect of the present invention, an optical path switching device constitutes an optical cross connector device of a second construction whereby optical path can be changed over without any momentary interruption, by coupling a WDM-cross connector section to an optical cross connector device (OCDM-XC) as described above.

In this case, preferably, a tunable wavelength converter is interposed in the coupling paths of the despreaders and spreaders in the optical cross connector device.

The optical signal from the input circuit is output to the output circuit through a path: WDM-cross connector section→optical cross connector device→WDM-cross connector section. In this case, it can be arranged for the input signal to be subjected to wavelength splitting at the WDM-cross connector section, the path to be determined in accordance with code and/or wavelength at the optical cross connector device, and the optical signal to be output to the output circuit corresponding to the determined path again through the WDM-cross connector section.

With this construction, the path through an output circuit where a fault has occurred can be temporarily evacuated on to another path and path setting then performed to a normal or free output circuit, so path changeover can be achieved without any momentary interruption.

According to a third aspect of the present invention, an optical path switching device consists of an optical add/drop multiplexing device wherein a code switch construction is formed in which two optical cross connector device stages as described above are linked in series, an optical code division multiplexing transmitting and receiving portion (OCDM-Tx/Rx) is coupled to this code switch, so that path changeover can be achieved for all paths, and so that path changeover without any momentary interruption and rapid path changeover can be achieved. Preferably, a WDM-cross connector section may be coupled with this optical cross connector device.

In this case also, preferably a tunable wavelength converter may be interposed in the coupling path of the despreaders and spreaders in the second optical cross connector device.

Also, preferably, this optical code division multiplexing transmitting and receiving portion (OCDM-Tx/Rx) is connected with a router capable of introducing or extracting any desired spreading code with respect to the outside.

According to a fourth aspect of the present invention, the optical path switching device constitutes a third optical cross connector device comprising a construction in which the optical cross connector device construction described with reference to the first aspect is altered.

This third optical cross connector device has a construction wherein selective setting of spreading code of respective spreaders can be performed. Furthermore, the despreaders are arranged to be capable of setting with a required spreading code and to be capable of setting such that spectrum despreading processing is not performed. Furthermore, a first intermediate stage coupler is provided on the coupling path of the branching stage and despreaders and a second intermediate stage coupler is provided on the coupling path of the despreaders and spreaders. The first intermediate stage coupler is provided so that the despreaders of the rear stage are capable of performing spectrum despreading processing of optical signals for all spreading codes that may be applied. In contrast, the second intermediate stage coupler is provided in order to direct the optical signals that have been subjected to spectrum despreading processing to the prescribed spreaders of the rear stage.

In this case, preferably, a tunable wavelength converter is interposed in the coupling path of the second intermediate stage coupler and spreaders in the third optical connector device.

By means of this third optical connector device, not only code path switching but also WDM path switching can be achieved and, furthermore, changeover without any momentary interruption, dynamic path changeover and scaling up of the input/output ports can be achieved.

BRIEF DESCRIPTION OF THE DRAWINGS

The foregoing and other objects, features and advantages of the present invention will be better understood from the following description taken in connection with the accompanying drawings in which:

FIGS. 13(A) and (B) are diagrams (2) of the operation of an entire optical add/drop multiplexer according to the third embodiment;

FIGS. 15(A) and (B) are block diagrams illustrating the layout of a device to which the optical cross connector device of the fourth embodiment is applied.

DESCRIPTION OF THE PREFERRED EMBODIMENTS (A) First Embodiment

A first embodiment wherein an optical path switching device according to the present invention is formed as an optical cross connector device is described below with reference to the drawings.

An optical cross connector device according to a first embodiment utilizes an OCDM device of variable code type and is also referred to as a first optical cross connector. The optical code division multiplexing (OCDM) system is a spread spectrum-direct sequence system using an optical modulator. An optical modulator can be changed over in "ns" or less by electrically altering the code pattern of the spreading code. The first embodiment aims to realize changeover without any momentary interruption or dynamic changeover by constituting a first optical cross connector device by applying the optical code division multiplexing (OCDM) technique. The first optical cross connector device may suitably called an OCDM cross connector device.

(A-1) Construction of the First Embodiment

Figure 1A:
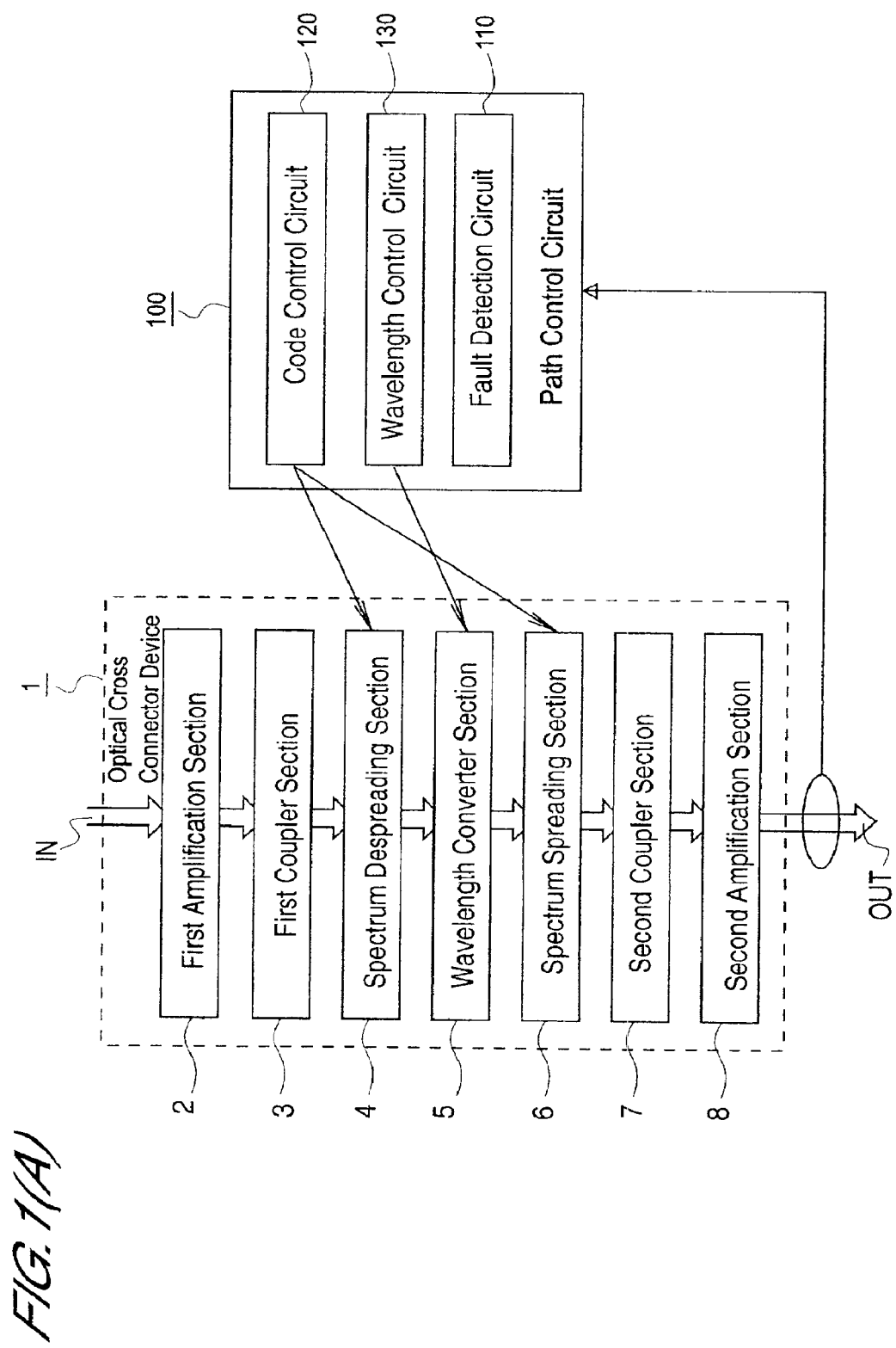
FIGS. 1(A), (B) and (C) are block diagrams given in explanation of a constructional example of an optical path switching device according to the present invention.
Figure 1B:
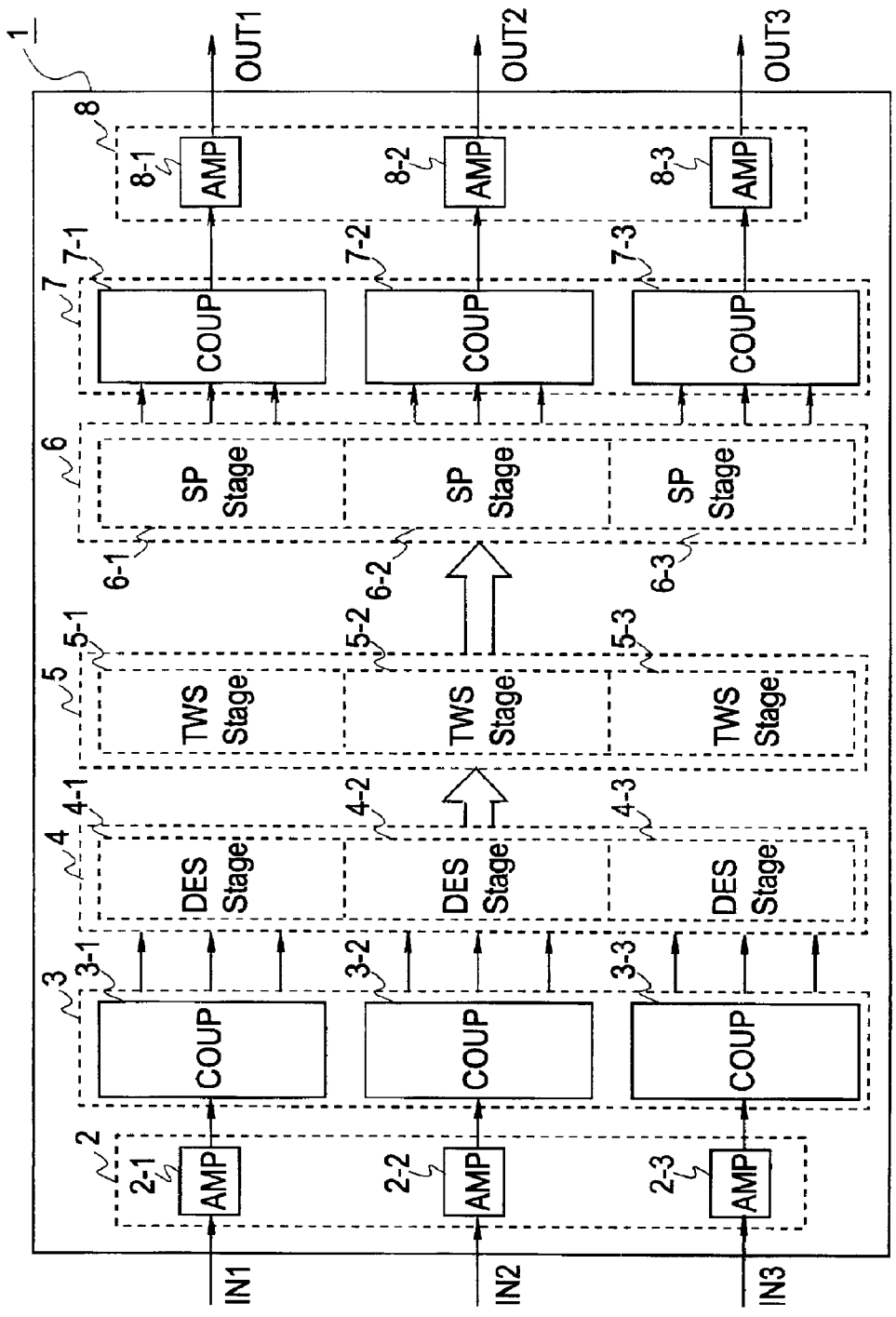

FIG. 1(A) is a schematic block diagram given in explanation of the overall appearance of a constructional example of an optical cross connector device according to a first embodiment. FIG. 1(B) is a block diagram illustrating the construction of major parts of the optical cross connector device 1 of the first embodiment. FIG. 1(C) is a detailed block diagram of major parts of FIG. 1(B). In FIG. 1(B), with a view to simplifying the description, a constructional example is illustrated in which the number of input circuits× number of output circuits is 3×3 and the number of codes per circuit is 3, but the number of circuits and number of codes of the optical cross connector device 1 of the first embodiment are not in any way restricted to this.

[A] As an example, the optical cross connector device 1 shown in FIG. 1(A) comprises a first amplification section 2, branching section i.e. first coupler section 3, spectrum despreading section 4, wavelength conversion section 5, spreading section 6, wave-combining section i.e. second coupler section 7 and second amplification section 8. First amplification section 2 first amplifies the input spread-spectrum optical signal arriving from external input circuit IN. First coupler section 3 branches the amplified optical signal. Spectrum despreading section 4 performs spectrum despreading processing on the branched optical signals. Wavelength conversion section 5 performs wavelength conversion on the optical signals that have thus been subjected to spectrum despreading. Spreading section 6 performs spectrum spreading processing on the optical signals that have thus been subjected to wavelength conversion. Second coupler section 7 combines the optical signals that have thus been subjected to spectrum spreading processing. Second amplification section 8 amplifies the optical signals that have thus been subjected to spreading and outputs these to external output circuit OUT. It should be noted that these first and second amplification sections 2 and 7 and wavelength conversion section 5 may be provided in accordance with need.

In this optical cross connector device 1, a path (routing) control circuit 100 for performing routing by controlling the required structural elements of this optical cross connector device 1 in response to detection of whether or not a fault has occurred in an output circuit thereof is connected. Path (routing) control circuit 100 chiefly comprises a fault detection circuit 110, coding control circuit 120, and wavelength control circuit 130. Fault detection circuit 110, if a fault occurs, detects the output circuits where there is a fault, and output circuits which are normal and in unoccupied condition, and sends this detected information to coding control circuit 120 and wavelength control circuit 130.

Using this detected information, coding control circuit 120 outputs individual changeover instructions to the respective spectrum despreading sections 4 and spreading sections 6 in order to set the spreading code dynamically. Using this detected information, wavelength control circuit 130 outputs individual changeover instructions to the wavelength changeover sections 5 in order to dynamically set the designated wavelength.

Referring to FIG. 1(B), in an optical cross connector device 1 according to the first embodiment, first amplification section 2 includes input stage optical amplifiers (AMP) 2-1 to 2-3, first coupler section 3 includes 1×3 couplers 3-1 to 3-3, spectrum despreading section 4 includes despreaders 4-11 to 4-33, wavelength conversion section 5 includes tunable wavelength converters (TWC) 5-11 to 5-33, spreading section 6 includes spreaders 6-11 to 6-33, second coupler section 7 includes 3×1 couplers 7-1 to 7-3, and second amplification section 8 includes output stage optical amplifiers (AMP) 8-1 to 8-3.

After the code division multiplexed optical signals from the three input circuits IN1 to IN3 have been amplified in the respectively corresponding input stage optical amplifiers 2-1 to 2-3, they are supplied to the corresponding 1×3 couplers 3-1 to 3-3.

It should be noted that, that in this constructional example, input circuit IN1 and output circuit OUT1 are chiefly designed as circuits for code division multiplexed optical signals of wavelength $\lambda 1$, input circuit IN2 and output circuit OUT2 are chiefly designed as circuits for code division multiplexed optical signals of wavelength $\lambda 2$, and input circuit IN3 and output circuit OUT3 are chiefly designed as circuits for code division multiplexed optical signals of wavelength $\lambda 3$.

Couplers 3-1 to 3-3 are respectively optical circuits whereby input optical signals are split or branched into a plurality, preferably with equal power. In this case, each coupler splits the optical signal into three, which are supplied to three despreaders (DES) 4-11 to 4-13, 4-21 to 4-23 and 4-31 to 4-33. This branching number is equal to the number of codes mentioned above. Each group of three despreaders respectively constitutes a spectrum despreading stage (DES Stage) 4-1, 4-2 or 4-3. A single spectrum despreading stage is provided for each input circuit ((see FIG. 1(B) and FIG. 1(C)).

The despreaders 4-11 to 4-33 are supplied with spreading code constituted by changeover instructions used for spectrum despreading processing from a code control circuit 120 outside the optical cross connector device. In this case, it will be assumed that this spreading code is constituted by for example codes A, B and C. By spectrum despreading processing using these spreading codes A, B or C, the despreaders selectively extract the optical signal of a single channel corresponding to a designated spreading code from a code division multiplexed optical signal. The extracted optical signal is sent to the corresponding wavelength converters 5-11 to 5-33. It should be noted that mutually different single spreading codes A, B or C are applied to the three despreaders in the same spectrum despreading stage.

The optical signals from spectrum despreading stages 4-1, 4-2, 4-3 are respectively sent to the tunable wavelength conversion stages (hereinbelow called simply conversion stages) (TWS Stages) 5-1, 5-2 and 5-3 corresponding to the subsequent stage. Conversion stages 5-1, 5-2, 5-3 are respectively constituted by tunable wavelength converters (hereinbelow called simply wavelength converters) of the number of codes i.e. in this case three. Wavelength converters 5-11, . . . , and 5-33 convert a particular input optical signal wavelength to a wavelength designated by a wavelength control circuit 130 outside the optical cross connector device. The optical signal that has thus been subjected to wavelength conversion is sent to the spreading stage (SP Stage) 6-1, 6-2, 6-3 constituting the next stage. The three wavelength converters constituting each conversion stage respectively output optical signals of mutually different wavelength.

In this construction example, as is clear from FIG. 1(C), an optical signal is sent from modulation conversion section 5 to spreading section 6. The first wavelength converter 5-11 associated with input circuit IN1 is therefore connected to the first spreader 6-11 associated with the output circuit OUT1, second wavelength converter 5-12 associated with input circuit IN1 is connected to the first spreader 6-21 associated with the output circuit OUT2, and third wavelength converter 5-13 associated with input circuit IN1 is connected to the first spreader 6-31 associated with the output circuit OUT3. The three channels associated with input circuit IN1 can therefore be respectively allocated to the three output circuits OUT1 to OUT3.

Likewise in respect of input circuit IN2 and input circuit IN3, the wavelength converters and spreaders are connected such that the three channels are allocated respectively to all of the output circuits OUT1 to OUT3.

In this case, the wavelength converters 5-11, 5-21, 5-31 that output optical signals of wavelength $\lambda 1$ are connected to the spreaders 6-11 to 6-13 associated with output circuit OUT1. Wavelength converters 5-12, 5-22, 5-32 that output optical signals of wavelength $\lambda 2$ are connected to the spreaders 6-21 to 6-23 associated with output circuit OUT2. And wavelength converters 5-13, 5-23, 5-33 that output optical signals of wavelength $\lambda 3$ are connected to the spreaders 6-31 to 6-33 associated with output circuit OUT3.

The spreaders 6-11, . . . , 6-33 are supplied with spreading code (of the three types A, B, C in FIG. 1) used for spectrum spreading processing and constituted by changeover instructions, from code control circuit 120 described above. Spreaders 6-11, . . . 6-33 supply these to the corresponding 3×1 couplers 7-1 to 7-3 constituting the second coupler section 8, by spectrum spreading processing using these spreading codes A, B or C, thereby putting these into a condition in which code division multiplexing of the optical signals can be achieved. It should be noted that, in this constructional example, the design is such that the three despreaders associated with the same output circuit are provided with a single fixed, mutually different, previously specified spreading code.

After spectrum spreading processing, the respective couplers 7-1, . . . , 7-3 combine the optical signals from the corresponding spreaders 6-11 to 6-13, 6-21 to 6-23 and 6-31 to 6-33 of the three channels before outputting these. Each of the output beams is optically amplified by the corresponding output stage optical amplifier 8-1 to 8-3 constituting second amplification section 8, before being output to the corresponding output circuit OUT1, OUT2 or OUT3.

It should be noted that, in this first embodiment, each circuit requires a number of codes corresponding to the number of circuits in respect of which changeover is performed, since the connection is such that the input circuit signals are output to all the output circuits. That is, adopting the usual notation, in the case of an N×N circuit processing layout, the number of codes for each circuit is N (where N is a positive integer). Also, although two optical amplifier stages, namely, an input stage and output stage are provided in FIG. 1, where lowered optical intensity is not a problem, it would be possible to use only a single stage, or to dispense with optical amplifiers.

(A-2) Operation of the First Embodiment

Figure 2:
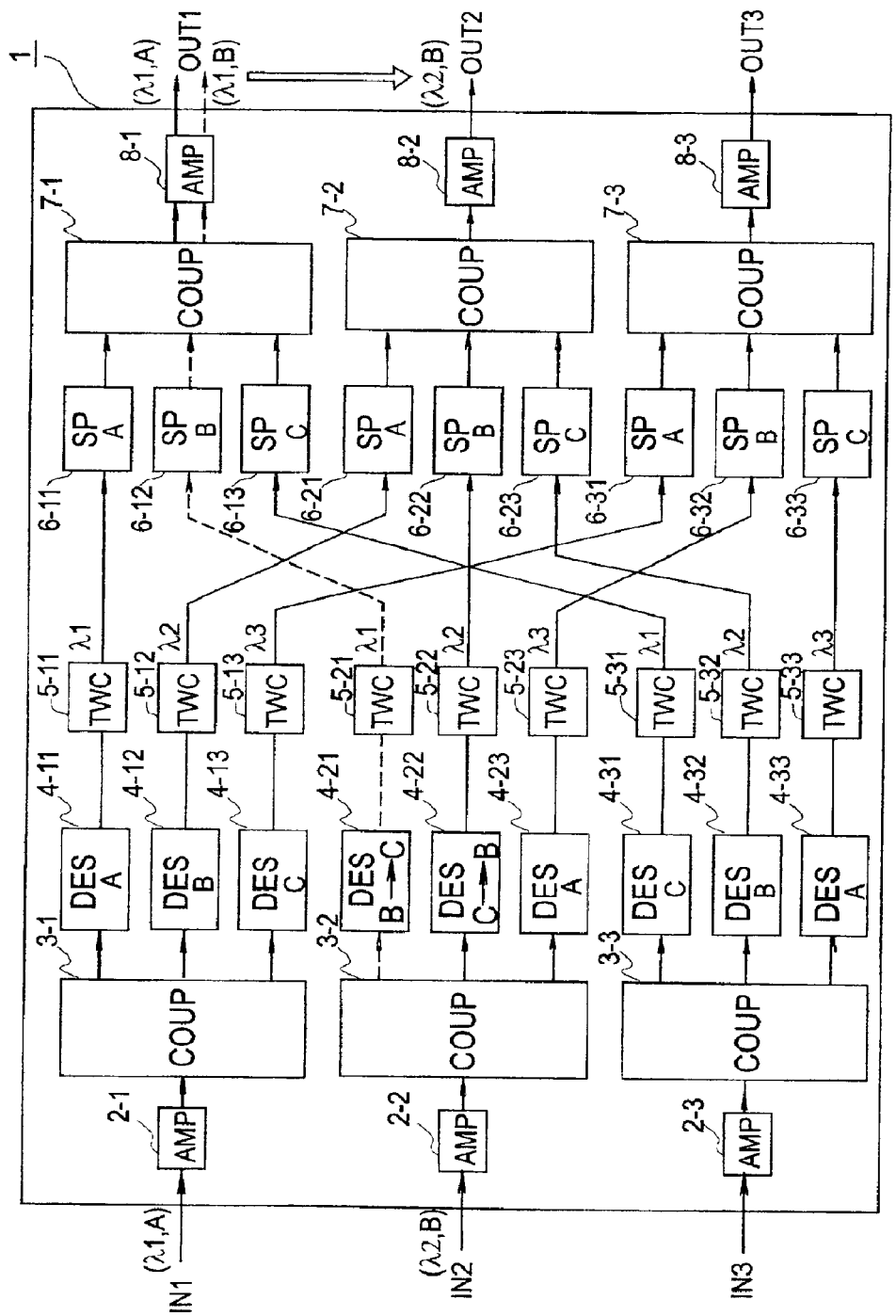
FIG. 2 is a diagram of the operation of an optical cross connector device according to a first embodiment.

Next, the operation of optical cross connector device 1 of the first embodiment is described with reference to FIG. 2. Hereinbelow, the description is given taking the operation of switching a 2-channel optical signal as an example.

[B] First of all, the following setting is performed as the initial condition. That is, it is arranged that, from input circuit IN1, optical code division multiplexing signals of wavelength $\lambda 1$ and spreading codes A, B and C are input, and from input circuit IN2, optical code division multiplexing signals of wavelength $\lambda 2$ and spreading codes A, B and C are input.

In despreaders 4-11 to 4-13, spreading codes A, B and C are set, in this order. Also, in despreaders 4-21 to 4-23, spreading codes B, C and A are set, in this order. Also, in despreaders 4-31 to 4-33, spreading codes C, B and A are set, in this order. It should be noted that, in the layout example shown in FIG. 1(B) and FIG. 1(C), the spreading codes of each of the despreaders are assumed to be set such that they can be altered by the changeover instruction from code control circuit 120.

It will be assumed that setting is respectively effected such that wavelength converters 5-11, 5-21, 5-31 convert the wavelength of the input signal to wavelength $\lambda 1$ before output, wavelength converters 5-12, 5-22, 5-32 convert the wavelength of the input signal to wavelength $\lambda 2$ before output and wavelength converters 5-13, 5-23, 5-33 convert the wavelength of the input signal to wavelength $\lambda 3$ before output. Further, it should be noted that, in the layout example shown in FIG. 1(B), the conversion wavelength in each wavelength converter is assumed to be fixed.

It will be assumed that setting is respectively effected such that spreading codes A, B and C in this order are set in spreaders 6-11 to 6-13. Also, it will be assumed that setting is respectively effected such that spreading codes A, B and C in this order are set in spreaders 6-21 to 6-23. Also, it will be assumed that setting is respectively effected such that spreading codes A, B and C in this order are set in spreaders 6-31 to 6-33. Further, it should be noted that, in the layout example shown in FIG. 1(B) and FIG. 1(C), the spreading codes in each spreader are assumed to be fixed.

First of all, the switching operation in normal communication condition will be described.

The code division multiplexing signal containing optical signal component ($\lambda 1$, A) (indicating (wavelength and code)) that is input from input circuit IN1 is amplified by input stage optical amplifier 2-1 before being split into three at coupler 3-1 and supplied to the three despreaders 4-11 and 4-13. In this case, the spreader 4-11 corresponds to spreading code A, so the optical signal of the channel associated with the optical signal component ($\lambda 1$, A) is extracted and this is output to spreader 6-11 with wavelength $\lambda 1$ from tunable wavelength converter 5-11. In spreader 6-11, the input optical signal is subjected to spectrum spreading processing using spreading code A; after this code spectrum spreading processing, the optical signal is output to output circuit OUT1 through coupler 7-1 and output stage optical amplifier 8-1.

Also, the code division multiplexed optical signal including the optical signal component of ($\lambda$2, B) that is input from input circuit IN2 is amplified by input stage optical amplifier 2-2 before being branched by coupler 3-2 and supplied to the three despreaders 4-21 to 4-23. Since the spreading code of despreader 4-21 is B, the optical signal of the channel associated with the optical signal component ($\lambda$2, B) is extracted from this despreader; the wavelength $\lambda$2 of this optical signal is converted to an optical signal of wavelength $\lambda$1 by tunable wavelength converter 5-21 and this optical signal is then output from this wavelength converter to spreader 6-12 with wavelength $\lambda$1 and spreading code B. In spreader 6-12, the input optical signal is subjected to spectrum spreading processing using spreading code B, and this optical signal that has been subjected to code spectrum spreading processing is output to output circuit OUT1 through coupler 7-1 and output stage optical amplifier 8-1.

Thus by processing as described above, optical signal components ($\lambda$1, A) and ($\lambda$2, B) from different input circuits IN1 and IN2 are code division multiplexed and output as ($\lambda$1, A) and ($\lambda$1, B) to the same output circuit OUT1.

In the communication condition as described above, when processing of the optical signal component ($\lambda$1, B) becomes impossible due for example to some fault etc. in a device in a downstream stage connected to the output circuit OUT1, this signal must be changed over to another path on which processing can be performed. This constitutes so-called cross-connection.

[C] Let us now assume that fault detection circuit 110 of routing control circuit 100 detects occurrence of a fault in processing of optical signal component ($\lambda$1, B) on output circuit OUT1. At this point, a path on which processing is performed normally is concurrently detected. These items of detection information are supplied to routing control circuit 100. Using this detection information, coding control circuit 120 and wavelength control circuit 130 of the routing control circuit 100 are started up, and changeover of the path of the output optical signal ($\lambda$1, B) is performed by executing control of optical cross connector device 1.

In this changeover, the optical signal component ($\lambda$2, B) that is input from input circuit IN2 is changed over for example so as to be output to output circuit OUT2 or output circuit OUT3.

Routing control circuit 100 for example after detecting that despreader 4-22 associated with input circuit IN2 is in a free condition in which no processing is being performed performs changeover of the spreading code of despreader 4-22 from C to B by supplying an instruction from coding control circuit 120 such that despreader 4-22 can process the optical signal component ($\lambda$2, B) that is input from input circuit IN2. Together with this changeover, coding control circuit 120 supplies an instruction to despreader 4-21 that hitherto processed the optical signal component ($\lambda$2, B) input from input circuit IN2, so that the spreading code is changed over from B to C.

Thanks to this changeover, although the optical signal component ($\lambda$2, B) that is input from input circuit IN2 cannot be processed by despreaders 4-21 and 4-23, it is subjected to spectrum despreading processing by despreader 4-22. The optical signal that has been subjected to this spectrum despreading processing is output to spreader 6-22, still with wavelength $\lambda$2, from tunable wavelength converter 5-22 corresponding to this despreader 4-22. This optical signal that has thus been output is subjected to spectrum spreading processing with spreading code B in spreader 6-22. After thus being subjected to code spectrum spreading processing, the optical signal is output to output circuit OUT2 through coupler 7-2 and output stage optical amplifier 8-2.

It should be noted that, since route changeover is performed by changeover of (the pattern of) spreading code in spectrum despreading processing, changeover can in fact be achieved in "ns" or less. Also, since the tunable wavelength converter is set to the wavelength (wavelength that is desired to be output) that is used by the external device to which the optical cross connector device is connected, changeover of wavelength in route changeover is unnecessary, so increase in the speed of the tunable wavelength converter is not called for.

(A-3) Benefit of the First Embodiment

As described above, with an optical cross connector device according to the first embodiment, route changeover can be achieved at high speed ("ns" or less), since route changeover is performed by changeover of the spreading code in spectrum despreading processing, utilizing an optical code division multiplexing technique for route changeover.

(B) Second Embodiment

Next, a second embodiment in which an optical path switching device according to the present invention is applied to an optical cross connector device is described with reference to the drawings.

The optical cross connector device according to the second embodiment has a construction that is capable of being more easily scaled up than the optical cross connector device of the first embodiment. In the case of the optical cross connector device of the first embodiment (OCDM-cross connector device), scaling up is difficult, due to problems concerned with the number of codes that can be realized. Accordingly, the optical cross connector device of the second embodiment is made capable of realizing high-speed changeover in a cross connector device of large size, due to a construction in which the optical cross connector device (OCDM-cross connector device) of the first embodiment is added to (fused with) a current WDM-cross connector device.

(B-1) Construction of the Second Embodiment

Figure 3:
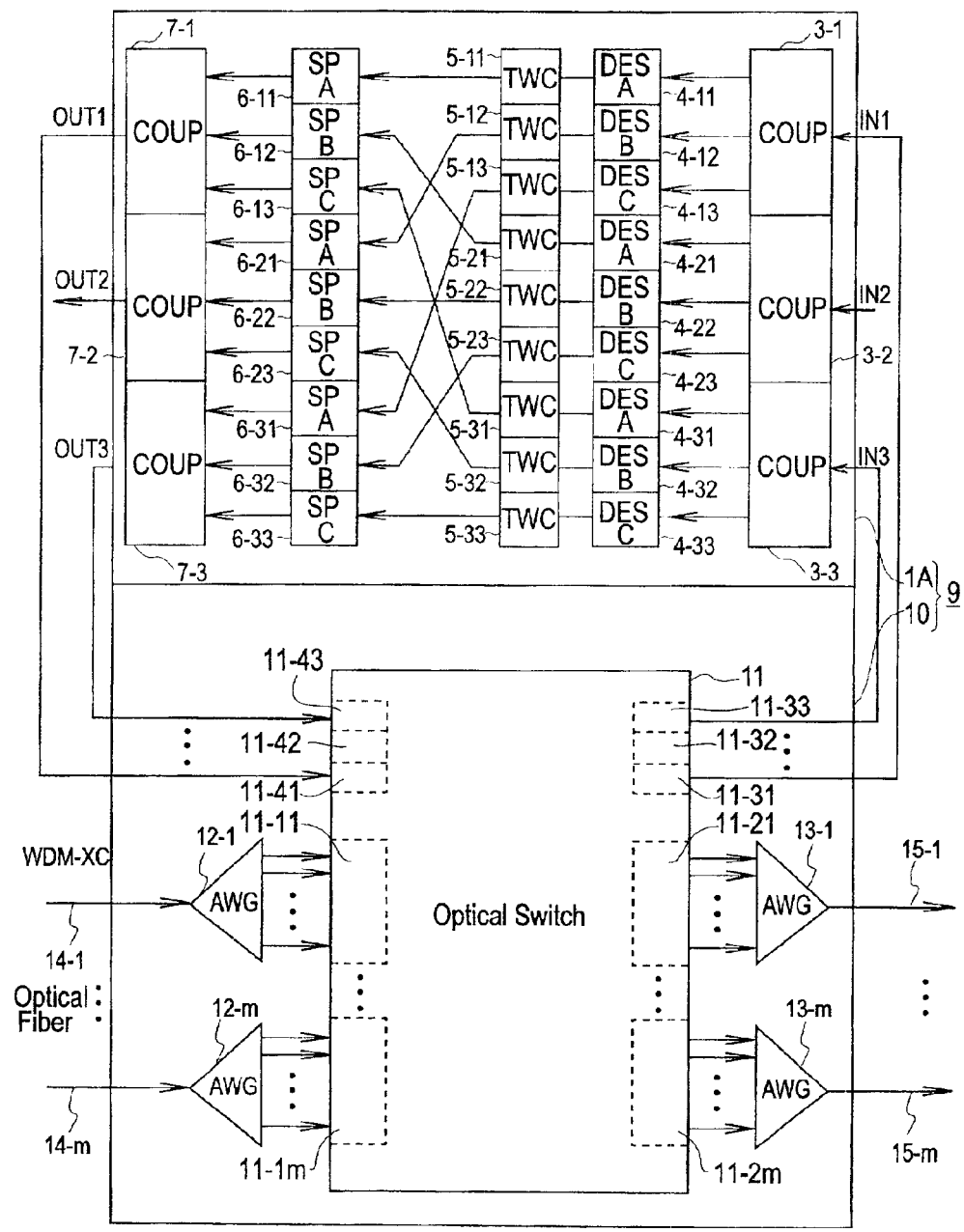
FIG. 3 is a block diagram illustrating the construction of an optical cross connector device according to a second embodiment.

FIG. 3 is a block diagram illustrating an example of the construction of an optical cross connector device 9 according to the second embodiment.

In FIG. 3, the optical cross connector device 9 of the second embodiment comprises in general terms a WDM-cross connector section (WDM-XC) 10 and an OCDM-cross connector section (OCDM-XC) 1A; it may also be referred to as a second optical cross connector device.

OCDM-cross connector section 1A has the layout of the optical cross connector device of the first embodiment already described. However, it should be noted that, in FIG. 3, OCDM-cross connector section 1A is described as not being provided with input stage and output stage optical amplifiers.

WDM-cross connector section 10 is provided with an optical switch 11, wavelength division demultiplexing sections (AWG) 12-1 to 12-$m$ and wavelength multiplexing sections (AWG) 13-1 to 13-$m$. Both of wavelength division demultiplexing and multiplexing sections are formed, for example, in arrayed waveguide fashions.

Wavelength division demultiplexing sections 12-1 to 12-m demultiplex the wavelength multiplexed optical signals supplied from the corresponding input side optical fibers 14-1, ..., 14-m into respective wavelength components (paths), and cause these to be input to optical switch 11.

Wavelength multiplexing sections 13-1, ..., 13-m respectively multiplex the wavelength components supplied from optical switch 11 and supply these to corresponding output side optical fibers 15-1, ..., 15-m.

Optical switch 11 performs switching processing on the optical signals of each of the wavelength components. Specifically, wavelength (path) replacement is performed by changeover of optical switch 11.

[D] For this purpose, in a preferred construction example of optical switch 11 shown in FIG. 3, there are provided a plurality of main input ports 11-11, ..., 11-m provided for each wavelength constituent of the optical signal, a plurality of main output ports 11-21, ... 11-m provided for each wavelength component of the optical signal, a plurality of auxiliary output ports 11-31, 11-32, and 11-33 respectively connected with respective input circuits IN1, IN2 and IN3, and a plurality of auxiliary input ports 11-41, 11-42, 11-43 respectively connected with respective output circuits OUT1, OUT2 and OUT3. The layout is such that the optical signals of each wavelength component can be allocated to the input circuits by respective connection of these respective main input ports with the auxiliary output ports. In addition, respective auxiliary input ports and respective main output ports are coupled such that path changeover of the optical signals from the output circuits therebetween can be effected. Allocation of these optical signals to an input circuit or changeover of optical path can be performed by means of an instruction from routing control circuit 100.

In addition, the main input ports 11-11, ..., 11-m are coupled with wavelength demultiplexing sections 12-1, ..., 12-m, and main output ports 11-21, ..., 11-m are coupled with wavelength multiplexing sections 13-1, ..., 13-m.

The wavelength demultiplexing sections demultiplex the incoming wavelength multiplexing optical signals arriving through input side optical fibers 14-1, ..., 14-m into optical signals of each wavelength component and send these optical signals which have been thus demultiplexed separately to the respective main input port. In contrast, the wavelength multiplexing sections perform wavelength multiplexing of the optical signals of each wavelength component from the respective main output ports, and output these to output side optical fibers 15-1, ..., 15-m.

The optical switch, wavelength demultiplexing sections and wavelength multiplexing sections described above constitute the WDM-optical cross connector section.

In the case of this second embodiment, the number of input/output ports of optical switch 11 is a number obtained by adding the number of input/output ports of OCDM-cross connector section 1A to (input/output optical fiber number)× (number of wavelengths in a single optical fiber).

Specifically, in the case of the second embodiment, optical switch 11 can perform switching processing such that the optical signals from each of the wavelength division demultiplexing sections 12-1, ..., 12-m are input to OCDM-cross connector section 1A and can perform switching processing such that the optical signals that are output from OCDM-cross connector section 1A are input to wavelength multiplexing sections 14-1, ..., 14-m.

It should be noted that although, in the case of FIG. 3, the case is shown where WDM-cross connector section 10 is not provided with a wavelength converter, a wavelength converter could be provided in the input stage or output stage of optical switch 11. For example, by providing a wavelength converter on the path connecting optical switch 11 and OCDM-cross connector section 1A, the wavelength handled by WDM-cross connector section 10 and the wavelength handled by OCDM-cross connector section 1A can be matched.

(B-2) Operation of the Second Embodiment

Figure 4:
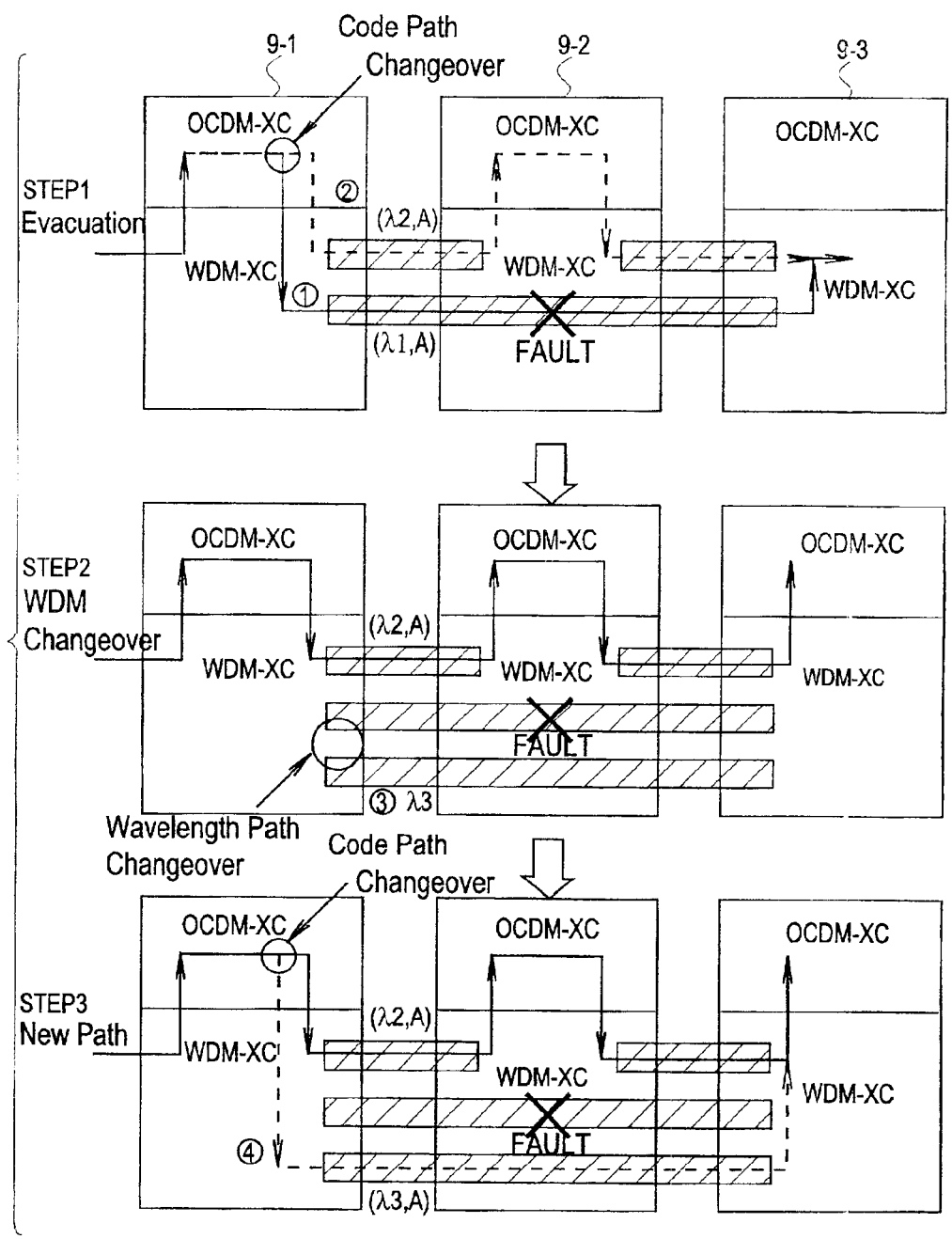
FIG. 4 is a diagram (1) of the operation of an optical cross connector device according to a second embodiment.
Figure 5:
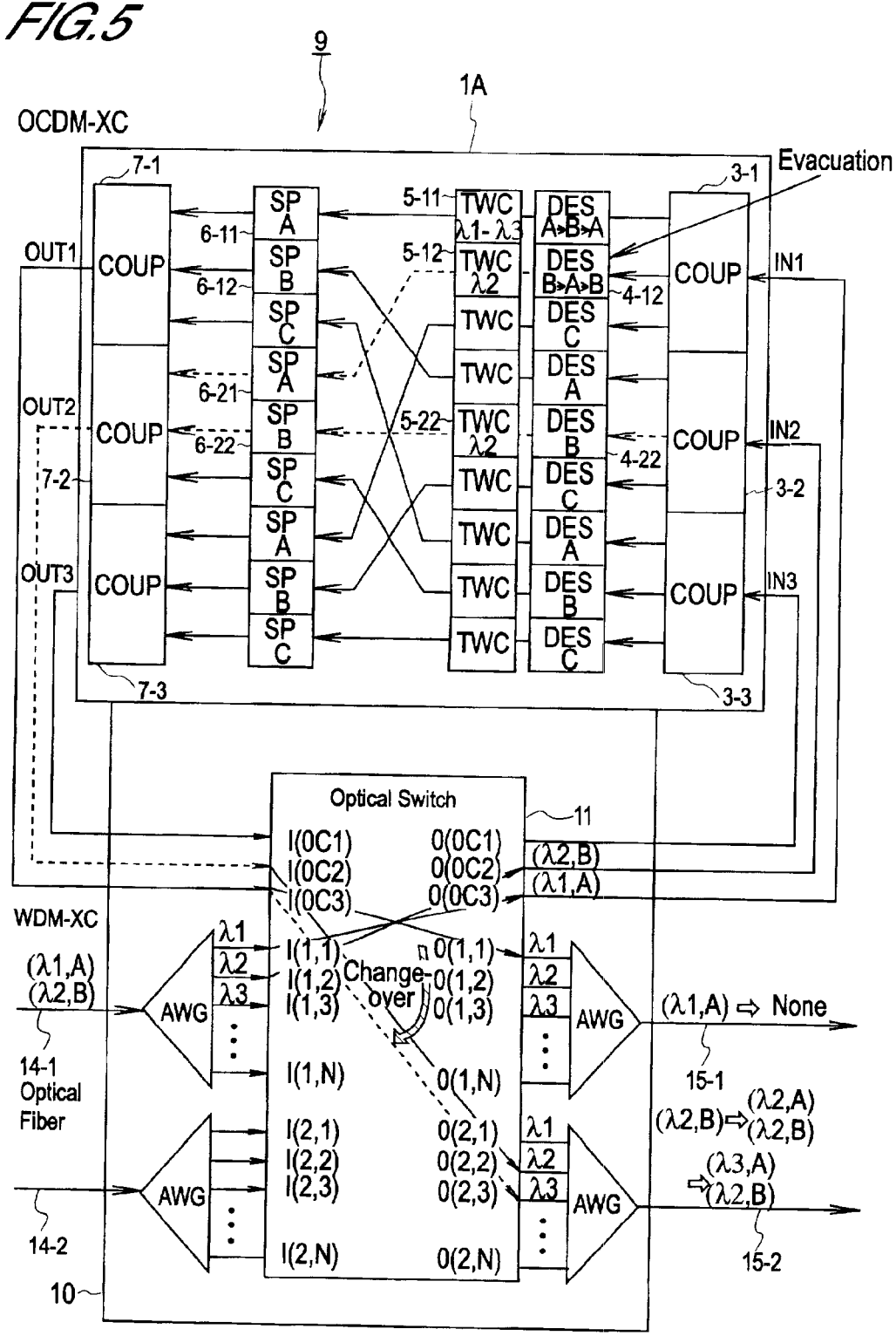
FIG. 5 is a diagram (2) of the operation of an optical cross connector device according to a second embodiment.

Next, the operation of the optical cross connector device 9 of the second embodiment will be described with reference to FIG. 4 and FIG. 5. FIG. 4 shows an example of path shift on path changeover in response to occurrence of a fault and FIG. 5 shows the operation of optical cross connector device 9.

First of all, the example of path shift shown in FIG. 4 will be described. FIG. 4 shows an example layout in which three optical cross connector devices 9 according to the second embodiment are connected. The respective optical cross connector devices are respectively designated by the symbols 9-1 to 9-3. The case is illustrated in which the path passing through devices 9-1 to 9-3 and the path passing through the second device 9-2 are formed by WDMs and an OCDM path is set therein.

Path changeover in response to occurrence of a fault is performed by a three-stage step involving evacuation, WDM changeover and new path setting. The control signals in respect of each section on path changeover are output by routing control circuit 100 in accordance with the code path and/or free condition of the WDM path etc.

[Step 1 (Evacuation)]

When, during the performance of communication on path ① ($\lambda$1, A) (indicating (wavelength, code)) in FIG. 4, a fault occurs on this path, first of all, evacuation processing is performed. In evacuation processing, the changeover of code path is performed by OCDM-cross connector section 1A of the first optical cross connector device 9-1. This changeover of code path is performed in the same way as already described in the description of operation of the first embodiment, so the changeover is executed without any momentary interruption. In FIG. 4, the case is shown where changeover is effected to code path ② ($\lambda$2, A) (see FIG. 2).

It should be noted that even if another path ($\lambda$2, B) were to be present of the same wavelength as the code path ($\lambda$2, A) that was changed over, no problems would arise, because the spreading code is different.

[Step 2 (WDM Changeover)]

As described above, by means of the evacuation processing, the signal that was transmitted by path ① ($\lambda$1, A) is transmitted by path ② ($\lambda$2, A) and the path of wavelength $\lambda$1 associated with the fault assumes an unused condition.

WDM-cross connector section 10 changes over the wavelength path of wavelength $\lambda$1 to wavelength path (③) of wavelength $\lambda$3. In fact, this changeover can be performed in a time of a few "ms". Also, the OCDM-cross connector section 1A of the first optical cross connector device 9-1 changes over the tunable wavelength converter (TWC) that processes the signal in question to wavelength $\lambda$3. In fact, this changeover can be performed in a time of a few "ms".

[Step 3 (New Path)]

By means of the WDM changeover processing described above, a new wavelength path of wavelength $\lambda$3 passing through the second optical cross connector device 9-2 is formed.

The code path ($\lambda$2, A) set for fault evacuation purposes is altered to the wavelength path ($\lambda$3, A) corresponding to the new wavelength by the OCDM-cross connector section 1A of the first optical cross connector device 9-1 (④). This changeover can be executed virtually without any momentary interruption.

Changeover of the optical path i.e. optical signal route on occurrence of a fault is thereby completed by successive performance of the three-step processing described above.

Next, an example of optical path changeover operation in the optical cross connector device 9 of the second embodiment will be described using FIG. 5. The optical path changeover operation in the optical cross connector device 9 described below corresponds to the operation in the first optical cross connector device 9-1 in FIG. 4. Also, FIG. 5 is an example when m=2 is put in FIG. 3. The main input port 11-11 therefore corresponds to I(1,1) to I(1, N). Also, main input port 11-12 corresponds to I(2,1) to I(2, N). Main output port 11-21 corresponds to O(1, 1) to O(1, N) and main output port 11-22 corresponds to O(2, 1) to O(2, N). Also, auxiliary output ports 11-31 to 11-33 correspond to O(OC3) to O(OC1), and auxiliary input ports 11-41 to 11-43 correspond to I(OC3) to I(OC1).

[Initial Condition]

It will be assumed that the initial condition prior to changeover is the condition indicated below.

Let us assume that optical signals ($\lambda 1$, A) and ($\lambda 2$, B) are input from input side optical fiber 14-1. Also, it will be assumed that the connection condition of the input/output ports of optical switch 11 is that I(1,1)-O(OC3), I(1,2)O(OC2), I(OC2)-O(2,1) and I(C3)-O(1,1) are connected. Furthermore, spreading codes A, B, C, A, B, C, A, B, C will be assumed to be allocated in that order from the upper side in FIG. 5 in respect of the nine despreaders 4-11 to 4-33 and spreaders 6-11 to 6-33. Furthermore, it will be assumed that the output wavelength of tunable wavelength converter 511 is set to $\lambda 1$ and the output wavelengths of tunable wavelength converters 5-12 and 5-22 are set to $\lambda 2$. Also, it will be assumed that signals ($\lambda 1$, A) are output from output side optical fiber 15-1 and that signals ($\lambda 2$, B) are output from output side fiber 15-2.

In this initial condition, it will be assumed that path changeover has become necessary due to occurrence of some fault on output side optical fiber 15-1. This changeover is performed by means of an instruction from the routing circuit (see FIG. 1 (A)).

[Step 1 (Evacuation)]

During evacuation processing, the condition (input/output port connection condition) of optical switch 11 of WDM-cross connector section 10 is unchanged. In other words, no changeover of WDM path is performed.

The spreading code of despreader 4-11 of OCDM-cross connector section 1A is changed over from A to B (or OFF (A is not selected)) and the code of despreader 4-12 is changed over from B to A. Due to this changeover, the optical signal ($\lambda 1$, A) from input circuit IN1 is subjected to spectrum despreading processing in despreader 4-12. Next, the optical signal that has been subjected to this spectrum despreading is converted to a signal of wavelength $\lambda 2$ by tunable wavelength converter 5-12 corresponding to this despreader 4-12, turning it into a spread spectrum optical signal ($\lambda 2$, A) that has been subjected to spectrum spreading processing with spreading code A by spreader 6-21, and this is then output to output circuit OUT2. On output, this optical signal ($\lambda 2$, A) is combined with optical signal ($\lambda 2$, B) by coupler 7-2.

Output circuit OUT2 is connected with the output side fiber 15-2 in WDM-XC, so, in the initial condition, the signal ($\lambda 1$, A) that was output to output side optical fiber 15-1 is output to output side fiber 15-2 as signal ($\lambda 2$, B), thanks to this evacuation processing.

It should be noted that, due to this evacuation processing, two signals ($\lambda 2$, A) and ($\lambda 2$, B) associated with the same wavelength $\lambda 2$ are sent to the output side fiber 15-2, so processing at OCDM cross connector section 1A in optical cross connector device 9 (9-2) further downstream than the previously mentioned optical cross connector device 9 (9-1) becomes necessary.

[Step 2 (WDM Changeover)]

Since the output signal to the output side fiber 15-1 has been eliminated by the evacuation processing of step 1 described above, changeover of the WDM path is performed.

In optical switch 11 of WDM-cross connector section 10, the connection between the input/output ports I(OC3)-O(1, 1) is changed over to connection between the input/output ports I(OC3)-O(2, 3). It should be noted that this example of changeover of the connection between the input/output ports is a case in which the free wavelength in output side fiber 15-2 is $\lambda 3$.

After this, the output wavelength of wavelength converter 5-11 of OCDM-cross connector section 1A is changed over from $\lambda 1$ to $\lambda 3$.

By means of such changeover, setting is effected such that a signal of wavelength $\lambda 3$ is output to output circuit OUT1 so that a signal of wavelength $\lambda 3$ can be output to output side fiber 15-2.

[Step 3 (New Path)]

In the OCDM-cross connector section 1A, the spreading code of despreader 4-11 is returned to A and the spreading code of despreader 4-12 is returned to B (or OFF).

In this way, the signal ($\lambda 1$, A) that is input to OCDM-cross connector section 1A from input circuit IN1 is converted to signal ($\lambda 3$, A) by successive processing by despreader 4-11, wavelength converter 5-11 and spreader 6-11 and is then output to output circuit OUT1.

Due to the changeover of the connection between the input/output ports of optical switch 11 of WDM-cross connector section 10, output circuit OUT1 is connected to the output side optical fiber 15-2, so signal ($\lambda 3$, A) is output from output side optical fiber 15-2.

Path changeover on occurrence of a fault is thus completed by the above steps.

It should be noted that signal ($\lambda 2$, B), which is unrelated to the fault, continues to be output to output side optical fiber 15-2. Thus, two signals ($\lambda 3$, A) and ($\lambda 2$, B) are output to the output side optical fiber 15-2, but, since their wavelengths are different, at optical cross connector device 9 (9-2) which is downstream of the optical cross connector device 9 (9-1) in question, it is also possible to perform path switching at WDM-cross connector section 10.

(B-3) Benefit of the Second Embodiment

In this way, with the optical cross connector device 9 of the second embodiment, by increasing the number of ports of the optical switch 11 of WDM-cross connector section 10 and connecting OCDM-cross connector section 1A, when the need arises for path changeover (for example in the event of occurrence of a fault), WDM-cross connector section 10 can be changed over by temporary evacuation of WDM-cross connector section 10 in favor of a free path by OCDM-cross connector section 1A, after which the signal evacuated from OCDM cross connector section 1A is set on a new path; path changeover without any momentary interruption can thereby be effected.

(C) Third Embodiment

Next, a third embodiment in which the optical cross connector device of the present invention is applied to an optical add/drop multiplexer (OADM) will be described with reference to the drawings.

The optical add/drop multiplexer of the third embodiment also has the function of an optical cross connector device inheriting the technical concept of the optical cross connector device of the first and second embodiments. This device has a construction in which changeover of all the paths can be achieved by devising an add/drop function. It may be remarked that not all the paths can be changed over in the optical cross connector devices of the first and second embodiments.

(C-1) Layout of the Third Embodiment

Figure 6:
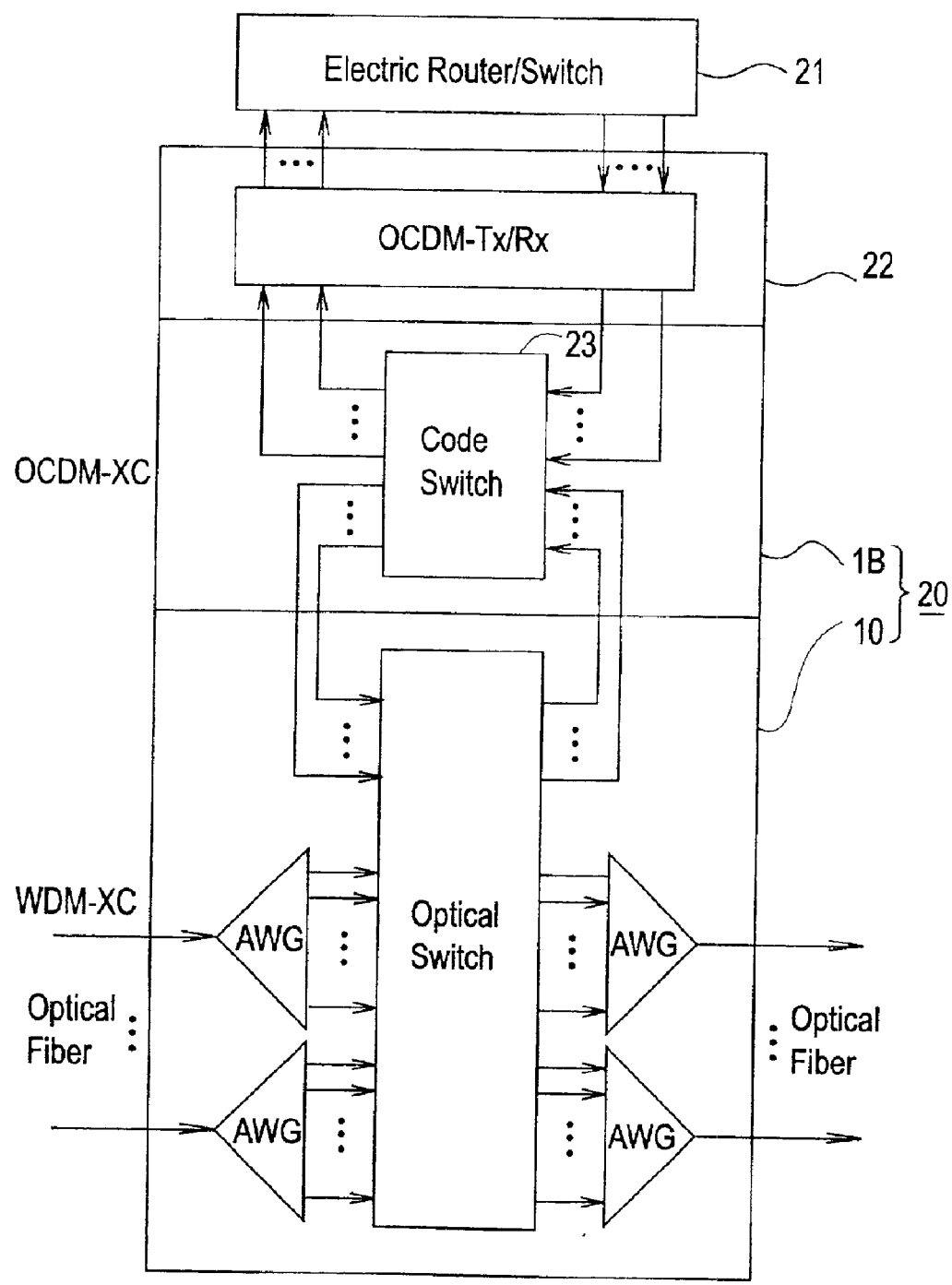
FIG. 6 is a block diagram illustrating the layout of an optical add/drop multiplexing device according to a third embodiment.

FIG. 6 is a block diagram illustrating a layout example of an optical add/drop multiplexer 20 according to a third embodiment. In FIG. 6, structural elements which are identical with the structural elements illustrated in FIG. 3 relating to the second embodiment described above and corresponding portions are respectively indicated by identical reference symbols and corresponding symbols.

In FIG. 6, optical add/drop multiplexer 20 provided with an optical cross-connection function according to the third embodiment is connected for example to an electrical router (switch) 21. This electrical router 21 is the transmission source of the signal that is to be added and is the destination to which the dropped signal is supplied.

In general terms, the optical add/drop multiplexer 20 according to the third embodiment consists of WDM-cross connector section (WDM-XC) 10, OCDM-cross connector section (OCDM-XC) 1B, and optical code division multiplexing transmitting and receiving portion (OCDM-Tx/Rx) 22.

Figure 7:
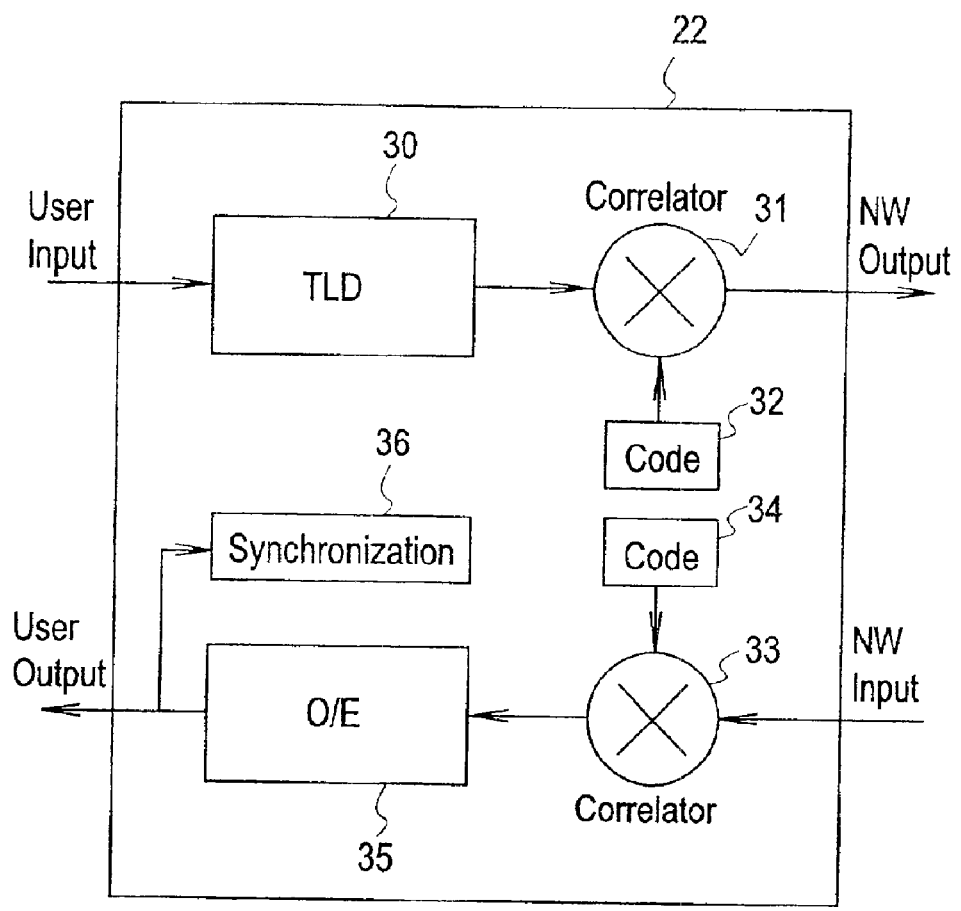
FIG. 7 is a block diagram illustrating the detailed layout of a code switch according to a third embodiment.

Optical code division multiplexing transmitting and receiving portion 22 performs the function (for example electro-optical conversion, opto-electrical conversion, signal adding and signal dropping etc) of interfacing electrical router 21 and the optical cross connection portion constituted by WDM-cross connector section 10 and OCDM-cross connector section 1B. FIG. 7 is a block diagram of an example layout of optical code division multiplexing transmitting and receiving portion 22.

Optical code division multiplexing transmitting and receiving portion 22 comprises a tunable wavelength light source (TLD) 30, transmission correlator 31, transmission code generating circuit 32, reception correlator 33, reception code generating circuit 34, opto/electrical converter (O/E) 35 and synchronization circuit 36.

Tunable wavelength light source 30 converts the user signal (electrical signal) that is sent from electrical router 21 to an optical signal of wavelength corresponding to the first-mentioned signal. Transmission correlator 31 performs spectrum spreading processing using the spreading code from transmission code generating circuit 32 on this optical signal, and outputs the optical signal that has thus been subjected to spectrum spreading processing to the network side (directly, code switch 23, to be described). It should be noted that tunable wavelength light source 30 could be of the type in which electro/optical conversion is performed by direct modulation or of the type in which electro/optical conversion is performed on light from the light source using an external modulator.

Reception correlator 33 performs spectrum despreading processing with the spectrum despreading code from reception code generating circuit 34 on the optical signal from the network side (directly, code switch 23, to be described). Opto/electrical converter 35 converts the optical signal after spectrum despreading processing into an electrical signal which is output to electrical router 21 as the user signal.

Synchronization circuit 36 synchronizes the spreading code from reception code generating circuit 34 with the optical signal from the network side, using the electrical signal from opto/electrical converter 35.

As already described with reference to FIG. 3, the WDM-cross connector section 10 in the third embodiment is the same as that in the second embodiment, so further description thereof is omitted.

Figure 8:
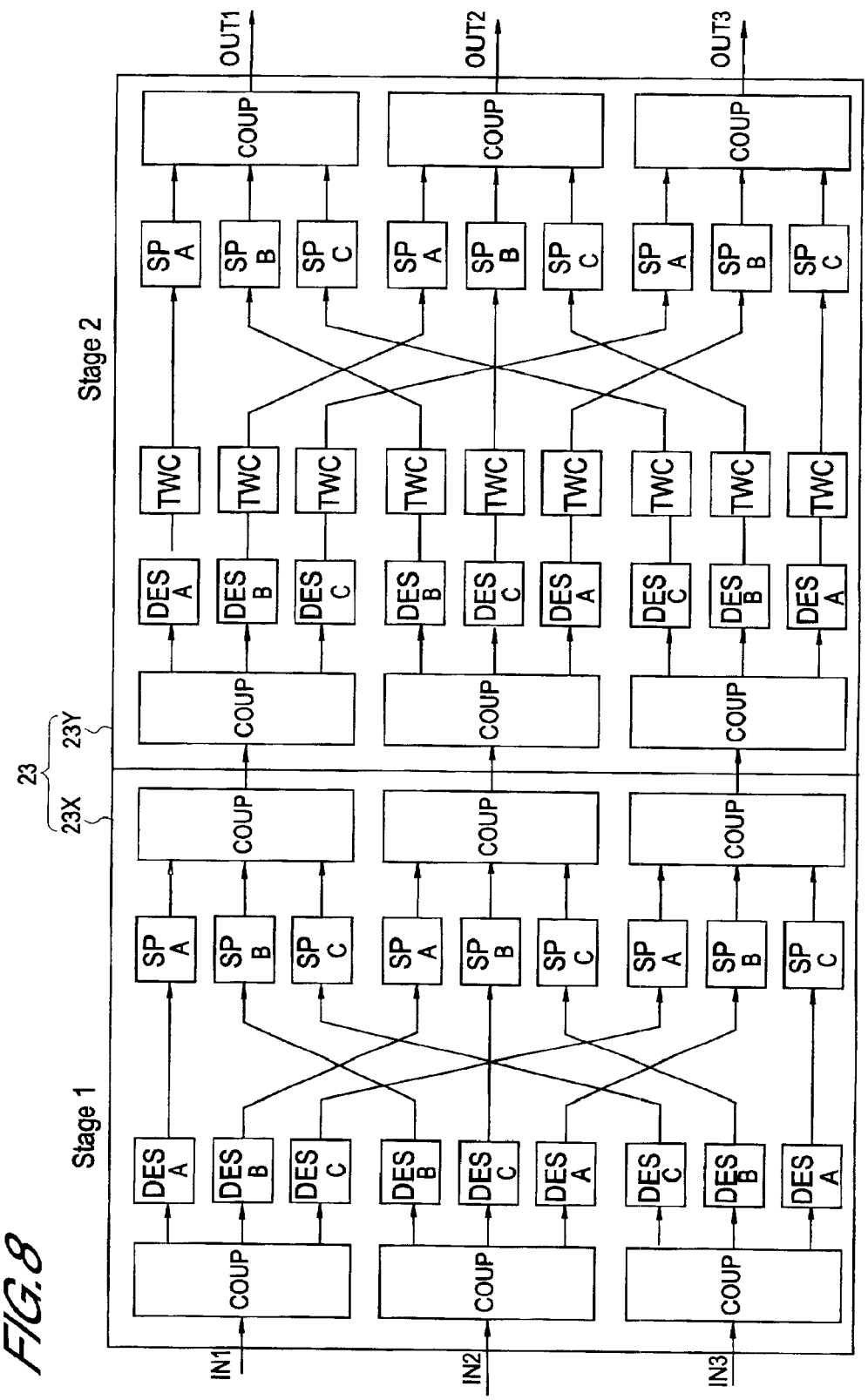
FIG. 8 is a block diagram illustrating the detailed layout of an optical code division transmitting and receiving portion according to the third embodiment.

In contrast, preferably the OCDM-cross connector section 1B in the third embodiment is constructed by a code switch 23 having the detailed layout shown in FIG. 8. The number of input/output ports of code switch 23 is the sum of the number of connections with the lower-layer WDM-cross connector section 10 and the number of connections with the upper-layer electrical router 21 (directly, the number of connections with optical code division multiplexing transmitting and receiving portion 22).

In FIG. 8, code switch 23 is of a two-stage construction comprising a cascade connection of a first code switch section (first stage) 23X and second code switch section (second stage) 23Y. The constructional example of FIG. 8 shows the case of 3×3 input/output ports of code switch 23.

The second code switch 23Y on the output side has the same construction as optical cross connector device 1 of the first embodiment described above. However, FIG. 8 shows a construction example in which no optical amplifier is provided. For example the output port OUT1 of this second code switch 23Y is connected to the output port of optical code division multiplexing transmitting and receiving portion 22 and output ports OUT2 and OUT3 are connected to an auxiliary output port of the optical switch.

Although the input side first code switch 23X has a construction similar to that of the optical cross connector device 1 of the first embodiment described above, its construction differs from that of the optical cross connector device 1 of the first embodiment in that no tunable wavelength converter (TWC) is provided. For example the input port IN1 of this first code switch 23X is connected with the input port of optical code division multiplexing transmitting and receiving portion 22 and input ports IN2 and IN3 are connected with the auxiliary input port of the optical switch.

It should be noted that, although it is unnecessary for the spreaders of both first code switch 23X and second code switch 23Y to have a variable function of the spreading code, the despreaders do need to have a variable function of the spreading code. However, it is possible to arrange for switching of all the code paths by giving the spreader of first code switch 23X a variable function of the spreading code and giving the despreader of the second code switch 23Y a variable function of the spreading code.

It should be noted that, although, in FIG. 8, no symbol is attached to the structural elements of code switch 23, when the structural elements are specified in the following description, the reference symbols of FIG. 1 relating to the first embodiment are applied and the difference between the structural elements of the first stage and second stage is indicated by appending the symbol suffixes "X" or "Y".

(C-2) Operation of the Third Embodiment

Next the operation of the optical add/drop multiplexer 20 of the third embodiment is described with reference to FIG. 9 to FIG. 13.

(C-2-1) Operation of Code Switch 23

First of all, the operation of OCDM-cross connector section 1B (code switch 23) will be described using FIG. 9 to FIG. 11.

[Operational Example 1 of Code Switch 23]

Figure 9:
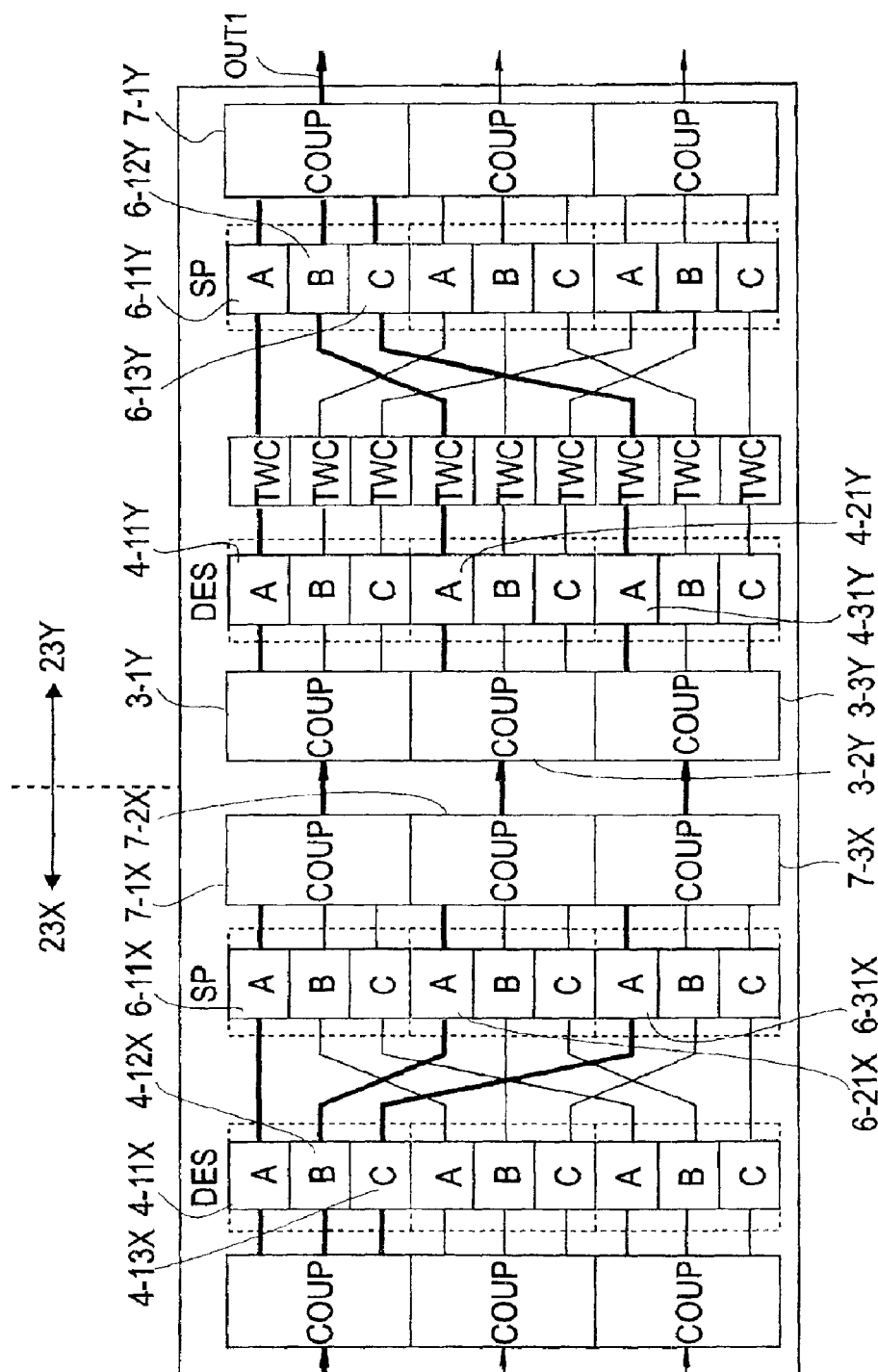
FIG. 9 is a diagram (1) of the operation of a code switch according to the third embodiment.
Figure 10:
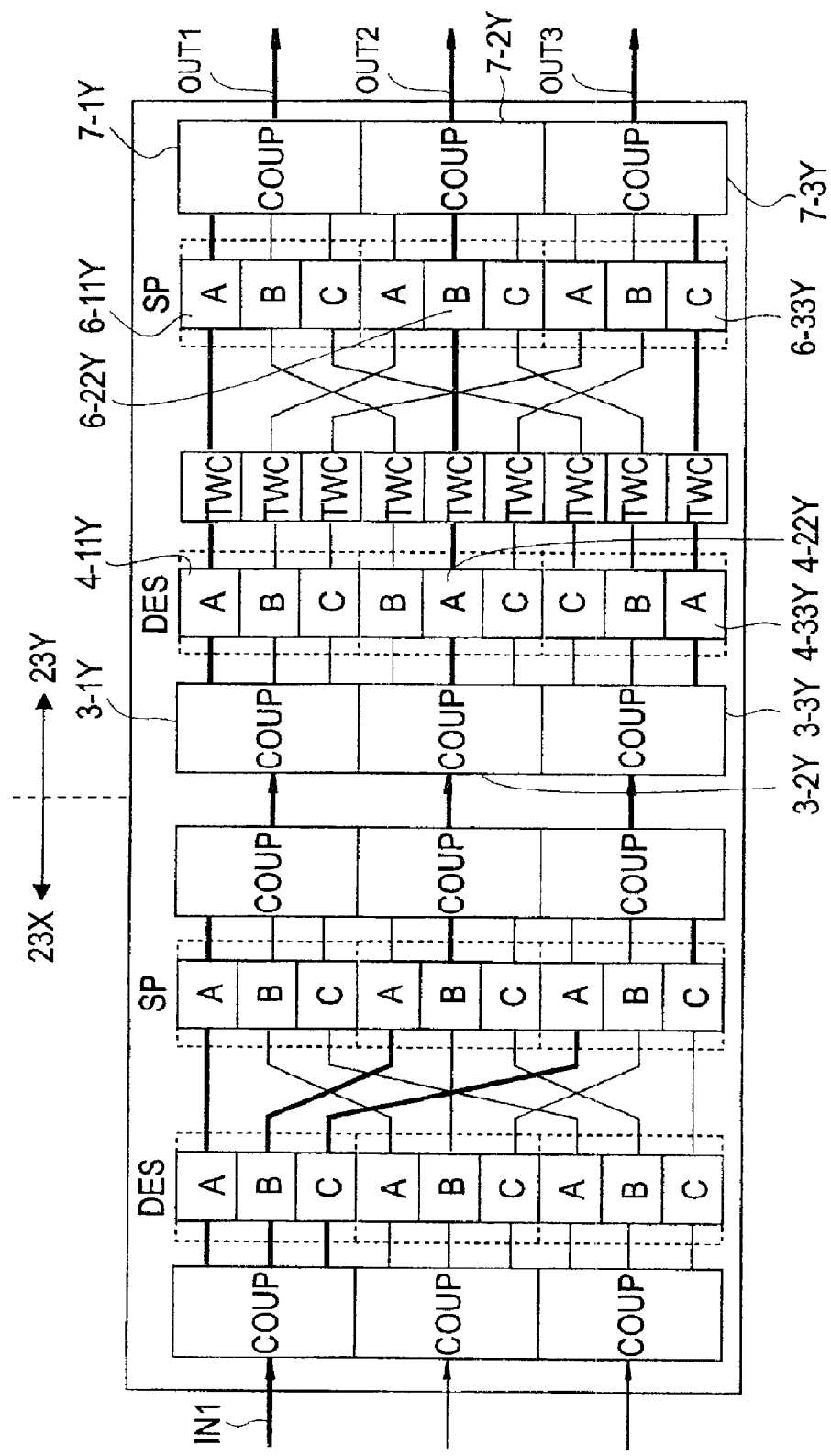
FIG. 10 is a diagram (2) of the operation of a code switch according to the third embodiment.

First of all, the operation in the case where optical signals of three spreading codes (signals of code A, code B and code C) are input from input circuit IN1 and these optical signals are all output on the same output circuit OUT1, is described using FIG. 9.

Setting is effected such that the respective spreading codes A, B, and C are selected in the three despreaders 4-11X to 4-13X relating to the input circuit IN1 of the first code switch 23X. In this way, after the input signal of spreading code A has been subjected to spectrum despreading processing in despreader 4-11X, it is supplied to spreader 6-11X to be converted into a signal of code A by spreader 6-11X. After the input signal of spreading code B has been subjected to spectrum despreading processing by despreader 4-12X, it is supplied to spreader 6-21X, to be converted into a signal of code A in spreader 6-21X. The input signal of spreading code C is subjected to spectrum despreading processing in despreader 4-13X and is supplied to spreader 6-31X, to be converted into a signal of code A in spreader 6-31X. Specifically, all these are converted into signals of spreading code A. These respective signals are combined with the other signals in output side couplers 7-1X to 7-3X and input to second code switch 23Y.

In the second code switch 23Y, spreading code A is set in the uppermost stage despreaders 4-11Y, 4-21Y and 4-31Y corresponding to the input side couplers 3-1Y to 3-3Y. By means of such code setting, the three signals that have been converted to signals of code A in first code switch 23X are subjected to spectrum despreading processing by these despreaders 4-11Y, 4-21Y and 4-31Y.

These despreaders 4-11Y, 4-21Y and 4-31Y are respectively connected to spreaders 6-11Y, 6-12Y and 6-13Y which are connected to the same output side coupler 7-1Y. The output signals from despreaders 4-11Y, 4-21Y and 4-31Y are therefore respectively subjected to spectrum spreading processing with spreading codes A, B, C by these spreaders 6-11y, 6-12Y and 6-13Y and the optical signals which have thus been subjected to spectrum spreading processing are then combined in coupler 7-1Y and output to output circuit OUT1.

[Operating Example 2 of Code Switch 23]

Next, the operation in a case where optical signals of three spreading codes (signals of code A, code B and code C) are input from input circuit IN1 and these are output to different output circuits OUT1, OUT2 and OUT3, is described with reference to FIG. 10.

In this case also, the operation in first code switch 23X is the same as in the case of operating example 1 described above.

In the second code switch 23Y, spreading code A is set in the uppermost stage despreader 4-11Y corresponding to input side coupler 3-1Y. Spreading code A is set in the intermediate-stage despreader 4-22Y corresponding to input side coupler 3-2Y. Spreading code A is set in the lowermost stage despreader 4-33Y corresponding to input side coupler 3-3Y. The three signals that have been converted to signals of code A in first code switch 23X are thus respectively subjected to spectrum despreading processing by these despreaders 4-11Y, 4-22Y and 4-33Y.

These despreaders 4-11Y, 4-22Y and 4-33Y are connected to spreaders 6-11Y, 6-22Y and 6-33Y which are respectively connected to the different output side couplers 7-1Y, 7-2Y and 7-3Y. The output signals (optical signals) from despreaders 4-11Y, 4-22Y and 4-33Y are therefore respectively subjected to spectrum spreading processing with spreading codes A, B, C by these spreaders 6-11Y, 6-22Y and 6-33Y and the optical signals which have thus been subjected to spectrum spreading processing are then combined in couplers 7-1Y, 7-2Y and 7-3Y and output to output circuits OUT1, OUT2 and OUT3.

[Operating Example 3 of Code Switch 23]

Figure 11:
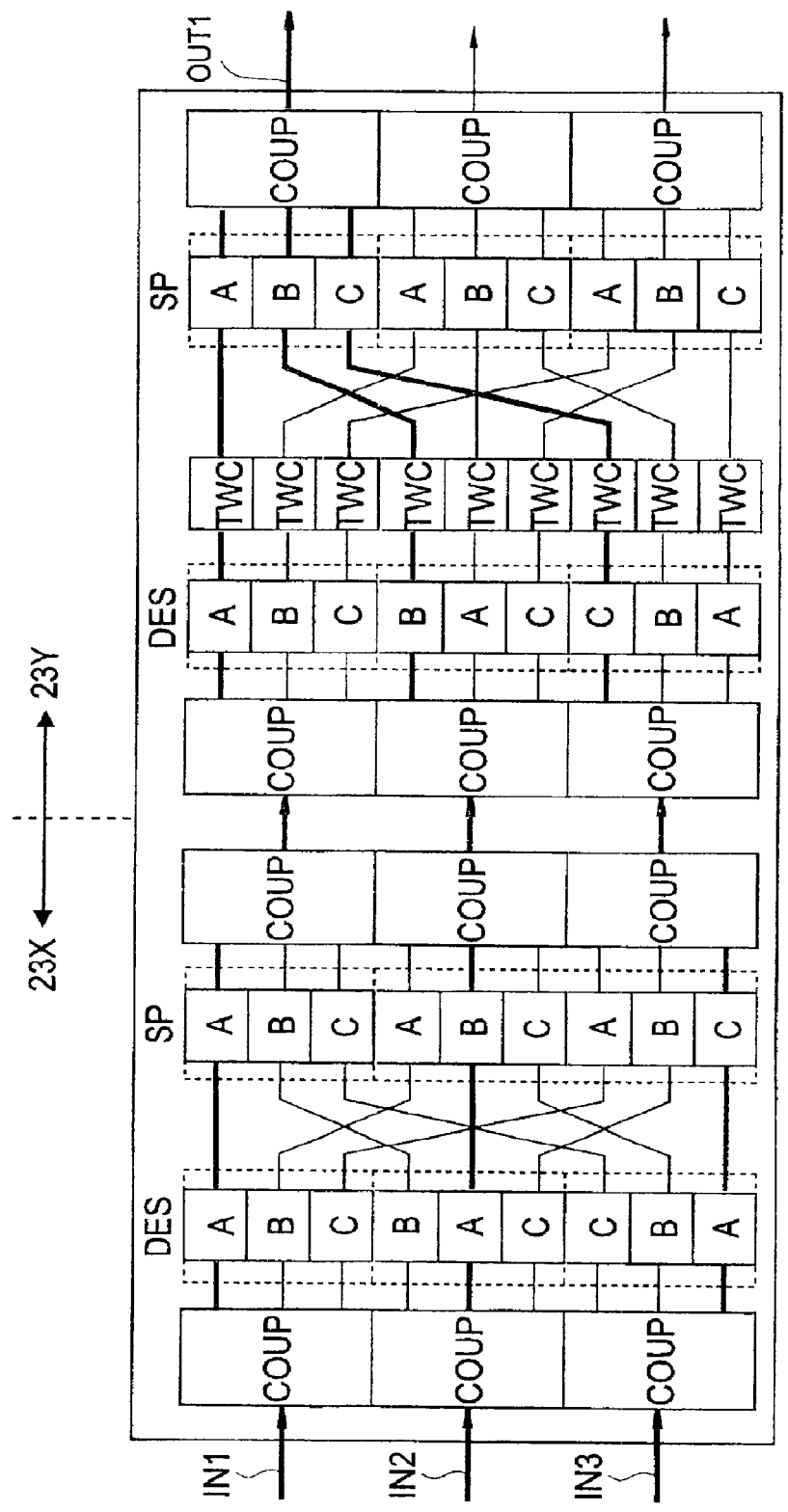
FIG. 11 is a diagram (3) of the operation of a code switch according to the third embodiment.

FIG. 11 shows a case where optical signals of the same spreading code A are input from different input circuits IN1 to IN3 and these are output to the same output circuit OUT1.

Although a detailed description will not be given, in this case, code switch 23 can perform path switching operation such that optical signals of the same spreading code A from different input circuits IN1 to IN3 are output to the same output circuit OUT1. This path changeover is made possible by setting of the spreading code in respect of the despreaders in first code switch 23X and second code switch 23Y.

As may be inferred from the three operating examples described above, changeover of all the code paths can be performed by making code switch 23 of a two-stage construction, comprising first code switch 23X and second code switch 23Y.

This means that the signals from electrical router 21 can be introduced into any desired code path and the signals from any desired code path can be introduced into electrical router 21.

(C-2-2) Overall Operation of the Third Embodiment

Next, the overall operation of optical add/drop multiplexer 20 of the third embodiment will be described with reference to FIG. 12 and FIG. 13. It should be noted that in FIG. 12 and FIG. 13 electrical router 21 and optical code division multiplexing transmitting and receiving portion 22 are together referred to as router 24. Also, FIG. 12 and FIG. 13 are shown with reference to the paths that are affected by the three optical add/drop multiplexers 20 (20-1 to 20-3).

Figures 12A, 12B:
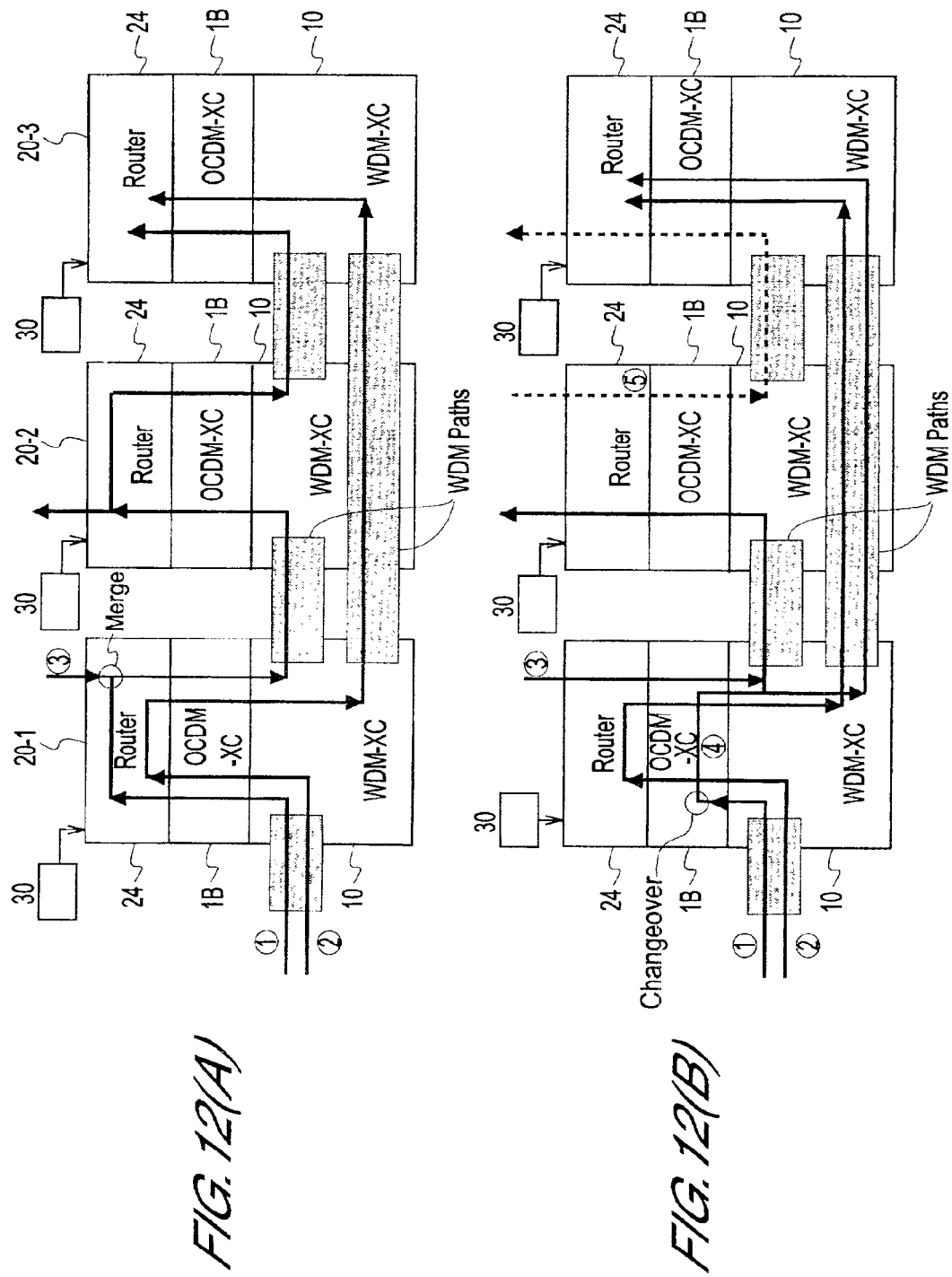
FIGS. 12(A) and (B) are diagrams (1) of the operation of an entire optical add/drop multiplexer according to the third embodiment.

In the example construction shown in FIG. 12(A), path ① and ② are formed as inputs to first device 20-1. Path ① to the second device 20-2 is formed through this WDM-cross connector section 10, OCDM cross connector section 1B and router 24. Path ② to the third device 20-3 is formed passing through second device 20-2 by means of WDM-cross connector section 10. Path ③ connected to the router 24 of first device 20-1 is merged with path ① at router 24 and is conveyed to second device 20-2.

In this condition, when there is an abrupt increase in the traffic of path ③, congestion is produced between first device 20-1 and second device 20-2 and as a result it is possible that the transfer efficiency of path ① may be affected. In these circumstances, if the data address of path ① is a third or subsequent device, merging with path ③ should be avoided.

In order to avoid such merging, as in FIG. 12 (B), path ① is changed over to another path (path ④) by the OCDM-cross connector section 1B of the first device 20-1. Specifically, path ① is changed over from the route passing through router 24 to a route i.e. path ④ passing through the OCDM-XC 1B.

This path changeover operation could also be effected by an existing WDM-cross connector device. However, since the changeover time of existing devices is of the order of ms, signal disconnection occurs on changeover. For this reason, prior to path changeover, it is necessary to temporarily change over to an evacuation path at the transmitting router. Specifically, since the device that changes over the path and the data generating device must perform this changeover the changeover operation cannot cope with traffic fluctuation. In the case of the third embodiment, path changeover may be performed by the device itself, in accordance with the result of detection performed by traffic monitor 30 that is connected to device 20.

It should be noted that, since the merging of path ① and path ③ is avoided, the portion of path ① that was utilized between the second device 20-2 and the third device 20-3 is released, so another path ⑤ can be extended into this portion.

In the constructional example shown in FIG. 13 (A), path ① and ② do not have a route passing through the router 24 of device 20-1, so, in FIG. 12 (A) a condition is produced in which there is no path ③. In this condition, transfers to second device 20-2 on path ① cease, while transfers to the third and subsequent devices 20-3 increase. Contrariwise, on path ②, transfers to the second device 20-2 increase. In FIG. 13 (A), it is assumed that path ②passes through second device 20-2, but the path reaching the second device 20-2 is bypassed by the third and subsequent devices.

In this case, changeover of path ① and path ② can be effected by first device 20-1. That is, as shown in FIG. 13(B), changeover of path ① and path ② can be effected by OCDM-cross connector section 1B of first device 20-1. In existing devices, where the source of transmission of the two paths is the same, it suffices to change over the output port of the router of the source of transmission, but, more frequently, the transmission sources are not the same. In such cases, the changeover operation is delayed since path changeover is effected by negotiation of the respective transmission sources with the management server.

The changeover without any momentary interruption described in the second embodiment can also be achieved when the optical add/drop multiplexer 20 of the third embodiment is applied.

(C-3) Benefits of the Third Embodiment

As described above, with the third embodiment, thanks to the two-stage switching construction adopted for the construction of the OCDM-cross connector section 1B, all changeover patterns of the OCDM-cross connector device can be performed, so changeover flexibility is increased and, in addition, changeover without any momentary interruption by path evacuation changeover can be performed as well as rapid path changeover in response to traffic fluctuations.

(D) Fourth Embodiment

Next, a fourth embodiment in which an optical path switching device according to the present invention is applied to an optical cross connector device will be described with reference to the drawings.

In the construction of the first embodiment described above, a number of codes equal to the number of output circuits is required, so scaling up becomes difficult (this also applies to the second embodiment and third embodiment utilizing this). In existing WDM-cross connector devices, a number of optical switch ports of the scale of about 1000× 1000 is envisaged. To apply OCDM-cross connector devices to all these ports would be difficult to achieve with current code division multiplexing techniques.

In this fourth embodiment, scaling up of the number of ports can be coped with (gate switch function) using a number of codes smaller than the number of output ports, by increasing the number of code selections (spectrum despreading) and performing ON/OFF control by despreaders.

(D-1) Construction of the Fourth Embodiment

Figure 14:
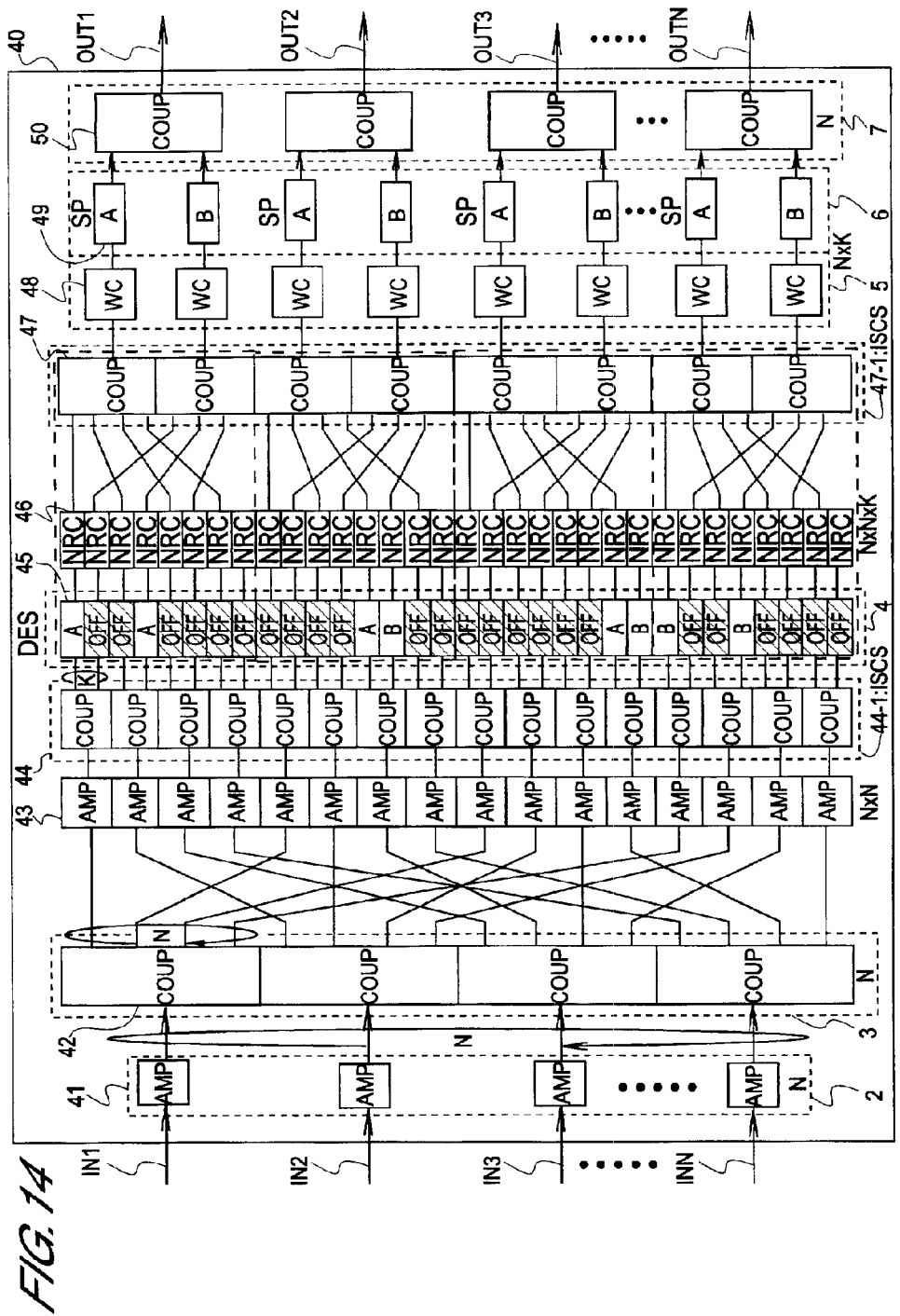
FIGS. 14 is a block diagram illustrating the layout of an optical cross connector according to a fourth embodiment.

FIG. 14 is a block diagram illustrating an example layout of an optical cross connector device (code switch, OCDM switch) according to a fourth embodiment. FIG. 14 illustrates a layout example in which the input/output circuits are 4×4 and the number of codes in a single circuit is 2; however, hereinbelow, the description will be given assuming that the number of input/output circuits is N×N and the number of codes in a single circuit is K (where K is an integer satisfying K<N).

In FIG. 14, the optical cross connector device 40 of the fourth embodiment, from the input side, comprises: N optical amplifiers (AMP) 41, a number N of 1×N couplers 42, N×N optical amplifiers (AMP) 43, a number N×N of 1×K couplers 44, N×N×K despreaders (correlators) (DES) 45, N×N×K noise removal circuits (N removal) (NRC) 46, a number N×K of N×1 couplers 47, N×K wavelength converters (WC) 48, N×K spreaders (SP) 49, and a number N of K×1 couplers 50. This optical cross connector device 40 will also be referred to as a third optical cross connector device. The assembly or group of couplers 44 will be referred to as first intermediate stage coupler section (ISCS) 44-1 and the assembly of couplers 47 will be referred to as second intermediate stage coupler (ISCS) 47-1.

The functions of the various structural elements described above will be clarified by the following operational description.

Despreaders 45 can be set to any of K spreading codes and can also assume an OFF condition (OFF) in which no spectrum despreading processing is performed.

Also, any desired connection of input circuits IN1 to INN and output circuits OUT1 to OUTN can be achieved by connection of the number N of 1×N couplers 42 and number N×N of optical amplifiers (AMP) 43. The signals at the number N×N of 1×K couplers 44 are branched, such that even when the code division multiplexing signals from input circuits IN1, ..., INN include all the codes, these code division multiplexing signals can be processed by despreader 45. The connection of the N×N×K noise removal circuits (N removal) 46 and number N×K of N×1 couplers 47 is a connection provided in order to direct the signals that have been subjected to spectrum despreading to the spreader 49 associated with the spreading code after wavelength conversion.

It should be noted that the portions enclosed by dotted lines in FIG. 14 are portions having numbers that can process all the input signals in respect of all output circuits.

FIG. 15 shows an example of application of the optical cross connector device (code switch, OCDM switch) 40 of the fourth embodiment to an optical path switching device.

FIG. 15(A) is a layout example in which the signals from all of the circuits are processed by OCDM-switch 40. In the input stage of OCDM-switch 40, there are provided wavelength division demultiplexing circuits (AWG) 53-1 to 53-L that demultiplex the wavelength multiplexing signals from input optical fibers 51-1 to 51-L to each wavelength (each circuit). In the output stage OCDM-switch 40, there are provided wavelength multiplexing circuits (AWG) 54-1 to 54-L that output to output optical fibers 52-1 to 52-L by wavelength multiplexing the signals of each wavelength (each circuit) from OCDM-switch 40.

FIG. 15 (B) is an example layout of the processing at OCDM-switch 40 of partial circuits only. This layout is the same layout as the layout described in the second embodiment with reference to FIG. 3, so a detailed description of the layout is omitted.

(D-2) Operation of the Fourth Embodiment

The operation of an optical cross connector device (code switch, OCDM-switch) 40 according to the fourth embodiment is described below with reference FIG. 16.

Figure 16:
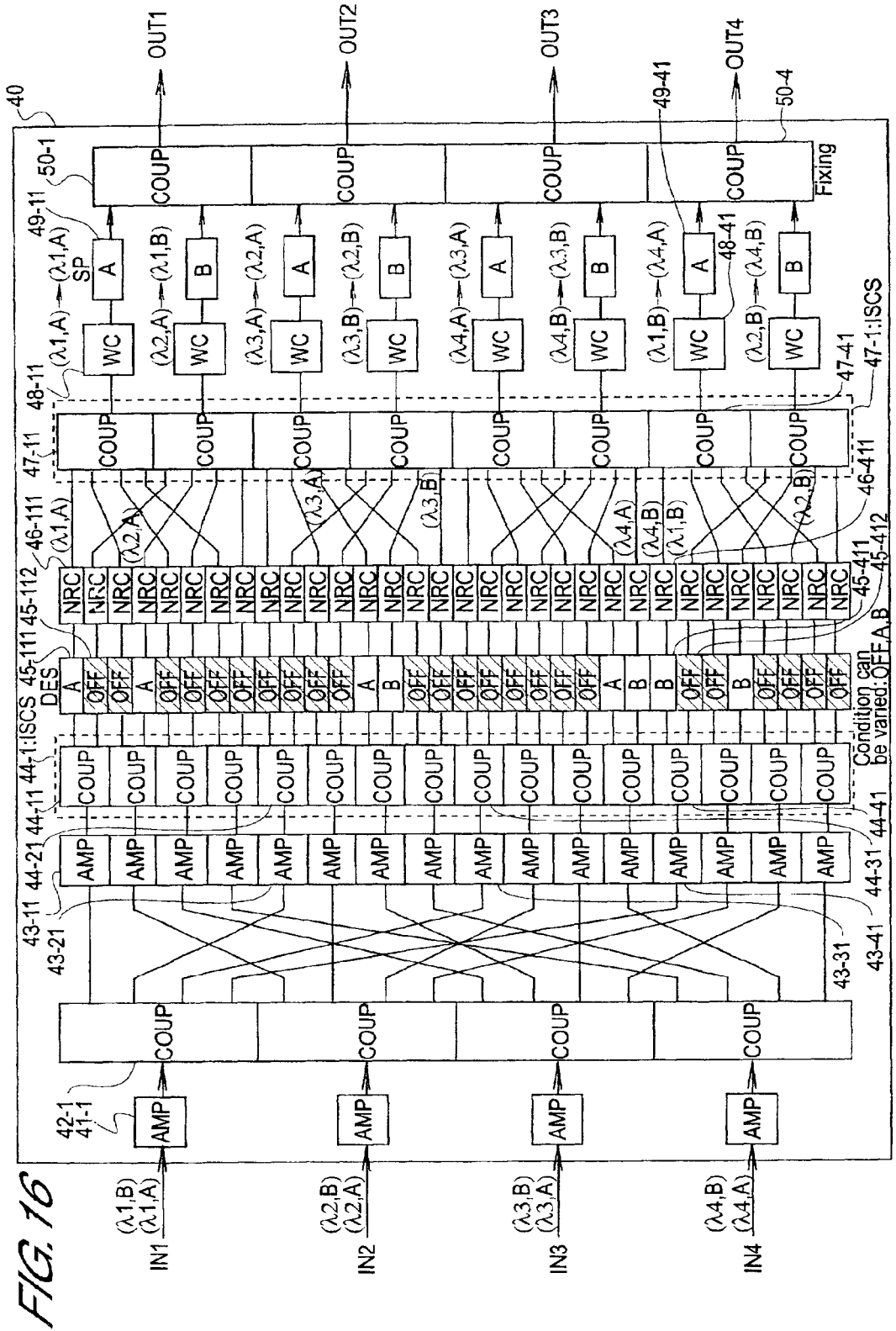
FIG. 16 is a diagram of the operation of an optical cross connector device according to the fourth embodiment.

It should be noted that FIG. 16 illustrates a layout example for the case where the number N of circuits is 4 and the number of codes K per circuit is taken as 2. Also, it will be assumed that the spreading codes used in each circuit are code A and code B. In the layout shown in FIG. 16, the case is illustrated in which signals are input from all the input circuits IN1 to IN4, but hereinbelow the operation of OCDM-switch 40 will be described taking as an example code path signals ($\lambda 1$, A) and ($\lambda 1$, B) from input circuit IN1.

The code division multiplexing signals ($\lambda 1$, A) and ($\lambda 1$, B) from input circuit IN1, after being amplified by passing through optical amplifier 41-1 in order to compensate for transmission loss, are branched into four by 1×4 coupler 42-1. The four branch signals are respectively supplied to optical amplifiers 43-11, 43-21, 43-31 and 43-41 associated with the respective output circuits OUT1, OUT2, OUT3 and OUT4. After their branching loss has thus been compensated by the optical amplifiers, the signals are supplied to the respectively corresponding branching 1×2 couplers (also called first intermediate stage couplers) 44-11, 44-21, 44-31 and 44-41. Also, the assembly or group of these first intermediate stage couplers will be referred to as first intermediate stage coupler section (ISCS) 44-1.

The 1×2 couplers 44-11, 44-21, 44-31 and 44-41 branch the input signals into two so that they are capable of dealing with all types of codes (two types in this case) and supply these respective branched input signals to the corresponding despreaders. For example, 1×2 coupler 44-11 supplies signals to despreaders 45-111 and 45-112 and 1×2 coupler 44-41 supplies signals to despreaders 45-411 and 45-412.

Despreader 45 plays the role of a gate switch. Whereas an ordinary gate switch performs ON/OFF (passage/disconnection) changeover, despreader 45 has the function of changing over between three conditions: allowing passage of code A, allowing passage of code B, or OFF (disconnection). It should be noted that, in the case where the number of codes is K, changeover of K+1 conditions: code 1/code 2/. . . /code K/OFF can be achieved.

FIG. 16 shows an example in which the despreader 45-111 connected to 1×2 coupler 44-11 is set for passage of signals of code A, despreader 45-112 is set to OFF, despreader 45-411 connected to 1×2 coupler 44-41 is set for passage of signals of code B, despreader 45-412 is set to OFF and the despreaders connected to 1×2 couplers 44-21 and 44-31 are all set to OFF.

In this way, in this set condition, code path signal ($\lambda 1$, A) in the code division multiplexing signal from input circuit IN1 is extracted by despreader 45-111. Also, despreader 45-111 extracts the code path signal ($\lambda 1$, B) in the code division multiplexing signal from input circuit IN1. It should be noted that, although, by the spectrum despreading processing, the code information is lost and code information is again applied by the spectrum despreading performed by the despreader in the subsequent stage, in the construction example of FIG. 16, in order to clarify the input signal flow, the reference symbols used for the input signals are also used to represent the signals between the despreader and spreader.

Noise removal circuits 46-111 and 46-411 remove the noise component from the output signal delivered from the respective corresponding despreaders 45-111 and 45-411, and supply these to the corresponding 4×1 couplers (also called second intermediate stage couplers) 47-11 and 47-41. The 4×1 couplers 47-11 and 47-41 have a four-input, single-output type of construction. However, due to the condition setting of the group of despreaders 45, the number of inputs of signals to the second intermediate couplers is at most one, so the second intermediate stage couplers do not perform wave-combining processing. Also, the assembly or group of these second intermediate stage couplers will be referred to as second intermediate stage coupler section (ISCS) 47-1.

The signals passing through the 4×1 couplers 47-11, 47-41 are supplied to wavelength converters 48-11, 48-41 where they are converted to wavelength $\lambda 1$ in accordance with the corresponding output circuits OUT1 and OUT4 in respective wavelength converters. As described above, since optical code processing is not performed on the incoming signal from despreader 45 to spreader 49 there is no possibility of a problem arising even if respective signals are subjected to wavelength conversion. Incidentally, in view of the fact that the number of wavelength converters is reduced, it is even possible to consider performing wavelength conversion after the final stage coupler. In this case, the number of wavelength converters becomes half that of the fourth embodiment, but, since wavelength conversion is performed on a signal that has been subjected to optical code processing, there is a possibility that the code condition might not be preserved. Currently used wavelength converters have a construction in which a reference light source is output in response to variations of intensity of the input optical signal, so if the spreading code is based on amplitude intensity, there is no problem, but, in the case of a spreading code based on phase, phase information is not preserved.

The signals that are output from wavelength converters 48-11, 48-41 have the desired spreading code (A) attached thereto by spreaders 49-11, 49-41 and, after this, are combined with code path signals from other paths in the corresponding 2×1 couplers 50-1, 50-4, before being output to output circuits OUT1 and OUT4.

As described above, the code path signals ($\lambda 1$, A) in the code division multiplexing signals from input circuit IN1 are converted to signals ($\lambda 1$, A) which are then output to output circuit OUT1. In contrast, the code path signals ($\lambda 1$, B) in the code division multiplexing signal from input circuit IN1 are converted to signals ($\lambda 4$, A) before being output to output circuit OUT4.

The code division multiplexing signals from the other input circuits IN2 to IN4 are also processed in the same way as described above. Switching as described below is performed by an optical cross connector device 40 of the construction shown in FIG. 16 described above.

The code path signals ($\lambda 2$, A) in the code division multiplexing signal from input circuit IN2 are converted to signals ($\lambda 1$, B) and output to output circuit OUT1, while the code path signals ($\lambda 2$, B) in the code division multiplexing signal from input circuit IN2 are converted to signals ($\lambda 4$, B) before being output to output circuit OUT4. Also, the code path signals ($\lambda 3$, A) in the code division multiplexing signal from input circuit IN3 are converted to signals ($\lambda 2$, A) before being output to output circuit OUT2, while the code path signals ($\lambda 3$, B) in the code division multiplexing signal from input circuit IN3 are converted to signals ($\lambda 2$, B) before being output to output circuit OUT2. Furthermore, the code path signals ($\lambda 4$, A) in the code division multiplexing signal from input circuit IN4 are converted to signals ($\lambda 3$, A) before being output to output circuit OUT3, while the code path signals ($\lambda 4$, B) in the code division multiplexing signal from input circuit IN4 are converted to signals ($\lambda 3$, B) before being output to output circuit OUT3.

It should be noted that, in the operation examples described above, the two input signals ($\lambda 3$, A) and ($\lambda 3$, B) from input circuit IN3 are output together to the same output circuit OUT2. This processing is equivalent to changing over the WDM path without changing over the code path.

In other words, in the constructional example of the fourth embodiment, code path switching and WDM path switching can both be performed.

It should be noted that, although description of the operation will be omitted, with the optical cross connector device of this fourth embodiment also, the changeover without any momentary interruption described with reference to the second embodiment or the dynamic path changeover described in the third embodiment can be performed, making it possible to cope with increase in scale.

(D-3) Benefits of the Fourth Embodiment

As described above, with the optical cross connector device according to the fourth embodiment, by providing despreaders also capable of OFF (disconnection) control in the number of the combinations (N×N×K) of input circuits, output circuits and types of spreading code, and setting code or setting OFF in these despreaders, a construction is produced such that input circuit input signals are defined that are output to the output circuits with prescribed spreading codes, so, even with an number of spreading codes of less than the number of circuits, changeover of all these at high speed can be achieved. The fact that the number of codes can be less than the number of circuits means, when put the other way round, that the number of circuits can be increased without increasing the number of codes, and so signifies that scaling up is possible.

It should be noted that, with the fourth embodiment also, changeover without any momentary interruption and dynamic path changeover are possible.

(E) Other Embodiments

Although, in the above first and fourth embodiments, cases were illustrated in which the wavelengths of the code division multiplexing signal input from different input circuits were different, it would be possible for the wavelengths of the code division signals input from all the input circuits to be the same. In this case, the wavelength converters can be dispensed with.

Also, as in the third embodiment, a two-stage connection of construction identical with that of the first embodiment could be applied to an optical cross connector device in which no WDM-cross connector section is connected.

Furthermore, the construction of a FIG. 15(B), shown as a construction in which the fourth embodiment is applied, could additionally be provided with a connection construction with an electrical router (see the Third Embodiment).

What is claimed is:

1. An optical path switching device wherein optical code division multiplexing signals multiplexed with code are input from a plurality of input circuits, signals of each code in the optical code division multiplexing signals are switched, and output to a plurality of output circuits, comprising:
   a plurality of despreaders provided to the number of codes corresponding to each input circuit, and capable of selecting all of the codes in the circuits;
   a plurality of spreaders that are supplied with signals selected by despreaders in one-to-one correspondence with themselves, and apply fixed allocation code to these sianals; and
   a combiner that is provided on each output circuit and outputs to the output circuit by combining signals from a plurality of spreaders corresponding to this output circuit,
   wherein the optical path switching device is constructed as a cascade connection of at least two stages.

2. An optical path switching device wherein optical code division multiplexing signals multiplexed with code are input from a plurality of input circuits, signals of each code in the optical code division multiplexing signals are switched, and output to a plurality of output circuits, comprising:
   a plurality of despreaders provided to the number of codes corresponding to each input circuit, and capable of selecting all of the codes in the circuits;
   a plurality of spreaders that are supplied with signals selected by despreaders in one-to-one correspondence with themselves, and apply fixed allocation code to these signals; and
   a combiner that is provided on each output circuit and outputs to the output circuit by combining signals from a plurality of spreaders corresponding to this output circuit,
   wherein the optical path switching device inputs optical code for the division multiplexing signals of different wavelength from each input circuit and outputs optical code division multiplexing signals of different wavelength on to each output circuit, respectively provided with tunable wavelength converters on the connection paths of corresponding said despreaders and said spreaders of the final stage.

3. An optical path switching device wherein optical code division multiplexing signals multiplexed with K codes (K is a positive integer) are input from N input circuits (N is a positive integer) and signals of each code in the optical code division multiplexing sianals are switched and output to N output circuits. comprising:
   N×N×K despreaders that are changed over between a code-selected condition and a disconnection condition;
   a signal distribution section whereby the N input optical code division multiplexing signals from each of the input circuits are distributed and supplied to all the despreaders;
   N×K spreaders whose output destination output circuits are fixed and that confer fixed allocation code on the outputs from each of the despreaders; and
   a connection section that connects the N despreaders which have different input optical code division multiplexing signals with each spreader such that their output signals are combined.
   wherein the optical path switching device inputs optical code division multiplexing signals of different wavelength from each of said input circuits and outputs optical code division multiplexing signals of different wavelength to each of said output circuits, comprising wavelength converters respectively on the connection paths of the N said despreaders and said spreaders.

4. An optical path switching device comprising an optical path switching device body having a construction which is the same as that of the optical path switching device according to claim 2;
   a wavelength demultiplexing section that demultiplexes input optical code division multiplexing/wavelength multiplexing signals into optical code division multiplexing signals of each wavelength component and inputs these to said optical path switching device body; and
   a wavelength multiplexing section that wavelength-multiplexes the optical code division multiplexing signals of each wavelength component output from said optical path switching device body.

5. An optical path switching device comprising a wavelength multiplexing path switching device comprising a wavelength demultiplexing section, an optical switch and wavelength multiplexing section; and
   a code path switching device having the same construction as the optical path switching device according to claim 2, connected to some of the input/output ports of said optical switch of this wavelength multiplexing path switching device.

6. The optical path switching device according to claim 5 comprising a path control section that, in the event that it is necessary to change over a prescribed path, performs changeover at said code path switching device side to an evacuation path, then, at said wavelength multiplexing path switching device side, performs changeover of the faulty path to a new path, and finally performs path control such that the path that was avoided at said code path switching device side is returned to a new path.

7. The optical path switching device according to claim 5 further comprising:
   a router section constituting the transmission source and transmission destination of signals; and
   an optical code division multiplexing transmitter and receiver that performs the function of interfacing this router section and said code path switching device, between this router section and said code path switching device.

8. An optical path switching device comprising an optical path switching device body having a construction which is the same as that of the optical path switching device according to claim 3;
   a wavelength demultiplexing section that demultiplexes input optical code division multiplexing/wavelength multiplexing signals into optical code division multiplexing signals of each wavelength component and inputs these to said optical path switching device body; and
   a wavelength multiplexing section that wavelength-multiplexes the optical code division multiplexing signals of each wavelength component output from said optical path switching device body.

9. An optical path switching device comprising a wavelength multiplexing path switching device comprising a wavelength demultiplexing section, an optical switch and wavelength multiplexing section; and
   a code path switching device having the same construction as the optical path switching device according to claim 3, connected to some of the input/output ports of said optical switch of this wavelength multiplexing path switching device.

10. The optical path switching device according to claim 9 comprising a path control section that, in the event that it is necessary to change over a prescribed path, performs changeover at said code path switching device side to an evacuation path, then, at said wavelength multiplexing path switching device side, performs changeover of the faulty path to a new path, and finally performs path control such that the path that was avoided at said code path switching device side is returned to a new path.

11. The optical path switching device according to claim 9 further comprising:
   a router section constituting the transmission source and transmission destination of signals; and
   an optical code division multiplexing transmitter and receiver that performs the function of interfacing this router section and said code path switching device, between this router section and said code path switching device.

12. An optical path switching device comprising:
   a branching section that branches and respectively outputs optical code division multiplexing signals input from an input circuit to branched optical sianals;
   a spectrum despreading section coupled with said branching section that respectively subjects said branched optical signals to spectrum despreading processing with spreading code respectively set from outside and respectively outputs said optical signals that have been subjected to spectrum despreading processing;
   a spreading section coupled with said spectrum despreading section that respectively performs spectrum spreading processing on said optical signals that have been subjected to spectrum despreading processing, with a fixed spreading code, and respectively outputs the optical signals that have thus been subjected to spectrum spreading processing, respectively having said fixed spreading code; and
   a combining section coupled with said spreading section that performs code division multiplexing on said optical signals that have been subjected to spectrum spreading processing and respectively outputs these to an output circuit,
   wherein said branching section, said spectrum despreading section, said spreader section and said combining section are coupled so as to be capable, by setting a new spreading code in said spectrum despreading section, of designating an output circuit whereby an optical signal relating to said new spreading code selected from said branched optical signal is output.

13. An optical path switching device comprising:
   a branching section that branches and respectively outputs optical code division multiplexing signals input from an input circuit to branched optical signals;
   a spectrum despreading section coupled with said branching section that respectively subjects said branched optical signals to spectrum despreading processing with spreading code respectively set from outside and respectively outputs said optical signals that have been subjected to spectrum despreading processing;
   a spreading section coupled with said spectrum despreading section that respectively performs spectrum spreading processing on said optical signals that have been subjected to spectrum despreading processing, with a fixed spreading code, and respectively outputs the optical signals that have thus been subjected to spectrum spreading processing, respectively having said fixed spreading code;
   a combining section coupled with said spreading section that performs code division multiplexing on said optical signals that have been subjected to spectrum spreading processing and respectively outputs these to an output circuit; and
   a respective plurality of said input circuits and output circuits, wherein
   said branching section comprises a plurality of branch elements, said respective branched elements being coupled in one-to-one relationship with said input circuits;
   said spectrum despreading sections comprises despreader stages respectively provided corresponding to respective said branch elements;
   said respective despreader stages respectively comprise a plurality of despreaders respectively individually coupled to corresponding output ports of the branch elements;
   said combining sections comprise a plurality of combining elements, said respective combining elements being coupled in one-to-one relationship with said output circuits, mutually different spreading coefficients being selectively set for each despreader belonging to the respective despreader stages; and
   said spreading sections comprise spreading stages respectively provided corresponding respectively to said combining elements, said spreading stages comprising a plurality of spreaders respectively individually coupled to corresponding input ports of the combining elements, the spreaders respectively belonging to said spreader stages being respectively coupled with a single despreader belonging to one or other mutually different despreader stage and the spreading coefficients of the spreaders belonging to the respective spreader sections being fixed to be mutually different.

14. An optical path switching device comprising:
a branching section that branches and respectively outputs optical code division multiplexing signals input from an input circuit to branched optical signals;
a spectrum despreading section coupled with said branching section that respectively subjects said branched optical signals to spectrum despreading processing with spreading code respectively set from outside and respectively outputs said optical signals that have been subjected to spectrum despreading processing;
a spreading section coupled with said spectrum despreading section that respectively performs spectrum spreading processing on said optical signals that have been subjected to spectrum despreading processing, with a fixed spreading code, and respectively outputs the optical signals that have thus been subjected to spectrum spreading processing, respectively having said fixed spreading code; and a combining section coupled with said spreading section that performs code division multiplexing on said optical signals that have been subjected to spectrum spreading processing and respectively outputs these to an output circuit,
wherein, taking the respective numbers of said input circuits and output circuits as being N,
if N is an integer of 2 or more and K is an integer of 2 or more,
said branch elements are branch elements of the type with one input and K outputs,
there are provided N of these branch elements,
there are provided K said despreaders,
said combining elements are combining elements of the type provided with K inputs and one output,
there are provided N of these combining elements, and
the number of said despreaders is K and there are provided K said spreaders.

15. The optical path switching device according to claim 13, wherein there are provided between the said despreaders and said spreaders wavelength converters that output with converted wavelength said input optical signals that have been subjected to spectrum despreading processing.

16. The optical path switching device according to claim 13 wherein an input stage amplifier is provided between said input circuits and said branch elements.

17. The optical path switching device according to claim 13, wherein an output stage amplifier is provided between said output circuits and said combining elements.

18. The optical path switching device according to claim 13, wherein an input stage amplifier is provided between said input circuits and said branch elements.

19. The optical path switching device according to claim 15, comprising an optical switch having a plurality of main input ports provided for each wavelength component of the optical signal, a plurality of main output ports provided for each wavelength component of the optical signal, a plurality of auxiliary output ports respectively connected to respective said input circuits, and a plurality of auxiliary input ports respectively connected to respective said output circuits;
respective said main input ports being connected with respective said auxiliary output ports such that the optical signals of each wavelength component can be allocated to said input circuits; and
respective said auxiliary input ports and respective said main output ports are coupled such that changeover of the optical signal path therebetween from said output circuits can be effected.

20. The optical path switching device according to claim 19, comprising a wavelength demultiplexing section and said main output port wavelength multiplexing section coupled with said main input port,
wherein this wavelength demultiplexing section demultiplexes the incoming wavelength multiplexing optical signal arriving through the input side optical fiber into optical signals of each wavelength component, and sends these demultiplexed optical signals individually to respective said main input ports;
said wavelength multiplexing section performs wavelength multiplexing of the optical signals of each wavelength component from respective said main output ports and outputs these to an output side optical fiber; and
said optical switch, wavelength demultiplexing section and wavelength multiplexing section constitute a WDM-optical cross connector section.

21. The optical path switching device according to claim 19, wherein a tunable wavelength converter is provided between one or other of between said auxiliary output port and input circuit and between said auxiliary input port and output circuit.

22. An optical path switching device comprising:
a first code switching section comprising:
a front stage side branching section that branches optical code division multiplexing signals input from an input port to branched optical signals and respectively outputs said branched optical signals;
a front stage side spectrum despreading section coupled with this front stage side branching section, that performs respective spectrum despreading processing on the branched optical signals with spreading code respectively set from outside and that respectively outputs optical signals subjected to spectrum despreading processing;
a front stage side spreader section coupled with said front stage side spectrum despreading section, that performs respective spectrum spreading processing on said optical signals that have been subjected to spectrum despreading processing with a fixed spreading code and that respectively outputs optical signals subjected to spectrum spreading processing having these respectively fixed spreading codes; and
a front stage side combining section coupled with said front stage side spreading section and that outputs the optical signals that have been subjected to spectrum spreading processing after subjecting them to code division multiplexing; and
a second code switching section comprising:
a rear stage side branching section coupled with said front stage side combining section and that branches optical signals that have been subjected to spectrum spreading processing input from said front stage side combining section to branched optical signals and respectively outputs said branched optical signals;
a rear stage side spectrum despreading section coupled with this rear stage side branching section, that performs respective spectrum despreading processing on the branched optical signals with spreading code respectively set from outside and that respectively outputs optical signals subjected to spectrum despreading processing;

a rear stage side spreader section coupled with said rear stage side spectrum despreading section, that performs respective spectrum spreading processing on said optical signals that have been subjected to spectrum despreading processing with a fixed spreading code and that respectively outputs optical signals subjected to spectrum spreading processing having said respectively fixed spreading codes; and a rear stage side combining section coupled with said rear stage side spreading section and that outputs to a respective output port the optical signals that have been subjected to spectrum spreading processing after subjecting them to code division multiplexing.

23. The optical path switching device according to claim 22, comprising a wavelength conversion section that outputs input optical signals that have been subjected to spectrum despreading processing after converting their wavelength, between said rear-stage side spectrum despreading section and said front stage side spreader section.

24. The optical path switching device according to claim 22, further comprising a wavelength multiplexing path switching section (WDM-XC) coupled between an input circuit and output circuit and coupled between an input port of said second code switch and an output port of said first code switch.

25. The optical path switching device according to claim 24, wherein said wavelength multiplexing path switching section comprises a wavelength demultiplexing section (AWG) coupled with said input circuit, a wavelength multiplexing section (AWG) coupled with said output circuit, and an optical switch having a main input port coupled with said wavelength demultiplexing section and a main output port coupled with said wavelength multiplexing section and an auxiliary output port coupled with an input port of said second code switch and an auxiliary input port coupled with an output port of said first code switch.

26. The optical path switching device according to claim 22, comprising an optical code division multiplexing transmitting and receiving portion OCDM-Tx/Rx) coupled between an output port and said second input port of said first code switch, and arranged so as to be capable of performing introduction and extraction of spreading code with respect to a router.

27. An optical path switching device comprising:
a branching section that branches an optical code division multiplexing signal input from an input circuit into branched optical signals and respectively outputs said branched optical signals;

a first intermediate stage coupler section coupled with said branching section;

a spectrum despreading section coupled with the first intermediate coupler section that respectively subjects said branched optical signals to spectrum despreading processing with spreading code respectively set from outside and that respectively outputs said optical signals that have been subjected to spectrum despreading processing;

a second intermediate stage coupler section coupled with said spectrum despreading section;

a spreading section coupled with said second intermediate stage coupler section that respectively subjects said optical signals that were subjected to spectrum despreading processing to spectrum spreading processing with spreading code respectively set from outside and that respectively outputs said optical signals that have been subjected to spectrum spreading processing having said respective spreading codes; and a combining section coupled with said spreading section that performs code division multiplexing on said optical signals that have been subjected to spreading processing and respectively outputs these to an output circuit, wherein said spectrum despreading section includes a plurality of spreaders in a portion of which spectrum despreading processing is selectively interrupted while in the remaining portion of which spreading code is selectively set and said spectrum spreading section includes a plurality of spreaders whose spreading codes are selectively set.

28. An optical path switching device comprising:
a branching section that branches an optical code division multiplexing signal input from an input circuit into branched optical signals and respectively outputs said branched optical signals;

a first intermediate stage coupler section coupled with said branching section;

a spectrum despreading section coupled with the first intermediate coupler section that respectively subjects said branched optical signals to spectrum despreading processing with spreading code respectively set from outside and that respectively outputs said optical signals that have been subjected to spectrum despreading processing;

a second intermediate stage coupler section coupled with said spectrum despreading section;

a spreading section coupled with said second intermediate stage coupler section that respectively subjects said optical signals that were subjected to spectrum despreading processing to spectrum spreading processing with spreading code respectively set from outside and that respectively outputs said optical signals that have been subjected to spectrum spreading processing having said respective spreading codes;

a combining section coupled with said spreading section that performs code division multiplexing on said optical signals that have been subjected to spreading processing and respectively outputs these to an output circuit; and a tunable wavelength converter section between said second intermediate stage coupler section and said spectrum spreading section.

* * * * *